(12) United States Patent
Forsyth et al.

(10) Patent No.: US 12,131,365 B2
(45) Date of Patent: Oct. 29, 2024

(54) SEARCH ENGINE USE OF NEURAL NETWORK REGRESSOR FOR MULTI-MODAL ITEM RECOMMENDATIONS BASED ON VISUAL SEMANTIC EMBEDDINGS

(71) Applicant: Board of Trustees of the University of Illinois, Urbana, IL (US)

(72) Inventors: David A. Forsyth, Urbana, IL (US); Ranjitha Kumar, Urbana, IL (US); Krishna Dusad, Urbana, IL (US); Kedan Li, Urbana, IL (US); Mariya I. Vasileva, Urbana, IL (US); Bryan Plummer, Urbana, IL (US); Yuan Shen, Urbana, IL (US); Shreya Rajpal, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 908 days.

(21) Appl. No.: 16/828,776

(22) Filed: Mar. 24, 2020

(65) Prior Publication Data
US 2020/0311798 A1    Oct. 1, 2020

Related U.S. Application Data

(60) Provisional application No. 62/823,512, filed on Mar. 25, 2019.

(51) Int. Cl.
*G06N 3/08* (2023.01)
*G06F 16/9535* (2019.01)
(Continued)

(52) U.S. Cl.
CPC ..... *G06Q 30/0627* (2013.01); *G06F 16/9535* (2019.01); *G06F 16/9577* (2019.01);
(Continued)

(58) Field of Classification Search
CPC .. G06F 17/2785; G06F 40/245; G06F 40/284; G06F 40/30; G06N 3/08; G06V 30/274
See application file for complete search history.

(56) References Cited

U.S. PATENT DOCUMENTS 10,062,039 B1 *   8/2018   Lockett ................. G06N 3/044
11,004,135 B1 *   5/2021   Sandler ............. G06Q 30/0631
(Continued)

OTHER PUBLICATIONS

Vinyals O, Toshev A, Bengio S, Erhan D. Show and tell: A neural image caption generator. InProceedings of the IEEE conference on computer vision and pattern recognition 2015 (pp. 3156-3164). (Year: 2015).*

(Continued)

*Primary Examiner* — Oluwatosin Alabi
(74) *Attorney, Agent, or Firm* — Lowenstein Sandler LLP

(57) ABSTRACT

A search engine server includes a communication interface through which to receive a multi-modal query from a browser of a client device, the multi-modal query including at least a first image of an item. A processing device, coupled to the communication interface, is to: execute a neural network (NN) regressor model on the first image to identify a plurality of second items that are similar to and compatible with the item depicted in the first image, wherein a set of images correspond to the plurality of second items; generate structured text that explains, within one of a phrase or a sentence, why the set of images are relevant to the item; and return, to the browser of the client device via the communication interface, a set of search results comprising the set of images and the structured text.

20 Claims, 26 Drawing Sheets

(51) Int. Cl.
| | |
|---|---|
| G06F 16/957 | (2019.01) |
| G06F 18/214 | (2023.01) |
| G06F 18/22 | (2023.01) |
| G06F 40/284 | (2020.01) |
| G06F 40/30 | (2020.01) |
| G06N 3/04 | (2023.01) |
| G06Q 30/0601 | (2023.01) |
| G06V 30/19 | (2022.01) |
| G06V 30/262 | (2022.01) |

(52) U.S. Cl.
CPC ............ *G06F 18/214* (2023.01); *G06F 18/22* (2023.01); *G06F 40/284* (2020.01); *G06F 40/30* (2020.01); *G06N 3/04* (2013.01); *G06N 3/08* (2013.01); *G06Q 30/0631* (2013.01); *G06Q 30/0643* (2013.01); *G06V 30/19147* (2022.01); *G06V 30/19173* (2022.01); *G06V 30/274* (2022.01)

(56) References Cited

U.S. PATENT DOCUMENTS

| | | | | |
|---|---|---|---|---|
| 11,551,079 | B2* | 1/2023 | Ghafoor | G06N 3/047 |
| 2018/0129742 | A1* | 5/2018 | Li | G06N 3/044 |
| 2018/0232451 | A1* | 8/2018 | Lev-Tov | G06F 16/248 |
| 2019/0355041 | A1* | 11/2019 | Sewak | G06Q 30/0643 |
| 2020/0150832 | A1* | 5/2020 | Winn | A61K 39/39566 |

OTHER PUBLICATIONS

Wang C, Yang H, Bartz C, Meinel C. Image captioning with deep bidirectional LSTMs. InProceedings of the 24th ACM international conference on Multimedia Oct. 1, 2016 (pp. 988-997). (Year: 2016).*
Aneja J, Deshpande A, Schwing AG. Convolutional image captioning. InProceedings of the IEEE conference on computer vision and pattern recognition 2018 (pp. 5561-5570). (Year: 2016).*
Wu Q, Shen C, Wang P, Dick A, Van Den Hengel A. Image captioning and visual question answering based on attributes and external knowledge. IEEE transactions on pattern analysis and machine intelligence. May 26, 2017;40(6):1367-81. (Year: 2017).*
Luger, Ewa, et al., 2016. "Like Having a Really Bad PA: The Gulf Between User Expectation and Experience of Conversational Agents," Proc. CHI, http://dx.doi.org/10.1145/2858036.2858288, San Jose, CA, USA (May 7-12, 2016).
Ma, Yihui, et al., "Towards Better Understanding the Clothing Fashion Styles: A Multimodal Deep Learning Approach," Proc. 31st AAAI Conference on Artificial Intelligence, pp. 38-44 (2017).
Mac, Shane, "There are a dozen ways to order a coffee. Why do dumb bots only allow one?," http://bit.ly/2nDGjCn. (Feb. 15, 2017).
Marcelino, Jose, et al., "A Hierarchical Deep Learning Natural Language Parser for Fashion," KDD Workshop on AI for Fashion, London, UK (Jun. 2018).
Martelaro, Nikolas, et al., "WoZ Way: Enabling Real-time Remote Interaction Prototyping & Observation in On-road Vehicles," Proc. CSCW Companion, http://dx.doi.org/10.1145/2998181.2998293, Portland, OR, USA (Feb. 25-Mar. 1, 2017).
McAuley, Julian, et al., "Image-based recommendations on styles and substitutes," Proc. SIGIR., http://dx.doi.org/10.1145/2766462.2767755, Santiago, Chile (Aug. 9-13, 2015).
McAuley, Julian, et al., "Inferring networks of substitutable and complementary products," Proc. KDD, Sydney, NSW, Australia (Aug. 11-14, 2015).
Mikolov, Tomas, et al., "Efficient estimation of word representations in vector space," arXiv:1301.3781 (Sep. 7, 2013).
Morris, Meredith Ringel, et al., "Remote shopping advice: enhancing in-store shopping with social technologies," Proc. CSCW, http://dx.doi.org/10.1145/2531602.2531707, Baltimore, MD, USA (Feb. 15-19, 2014).
Mortensen, Dennis, "Understanding the Facebook and Microsoft Chatbot Revolution," http://bit.ly/2jvqpod, (Apr. 28, 2016).
Mortensen, Dennis, R., X.Ai. https://x.ai/, (2017).
Nakamura, Takuma, et al., "Outfit Generation and Style Extraction via Bidirectional LSTM and Autoencoder," In Proc. KDD Workshop on AI for Fashion, London, UK (2018).
Neuberger, Assfa, et al., "Learning Fashion Traits with Label Uncertainty," In Proc. KDD Fashion Workshop, https://doi.org/10.475/123_4, Nova Scotia, Canada (Aug. 2017).
Rhodes, Margaret, "Now You Can Buy Burberry Stuff Straight Off the Runway," https://www.wired.com/2016/09/now-can-buy-burberry-stuff-straight-off-runway/, Wired (Sep. 19, 2016).
Rubio, Antonio, et al., "Multi-modal embedding for main product detection in fashion," ICCV Workshops, Venice, Italy, DOI: 10.1109/ICCVW.2017.261, pp. 2236-2242 (Jul. 1, 2017).
Saha, Amrita, et al., "Multimodal Dialogs (MMD): A large-scale dataset for studying mutimodal domain-aware conversations," CoRR abs/1704.00200, http://arxiv.org/abs/1704.00200 (2017).
Salvador, Amaia, et al., "Learning cross-modal embeddings for cooking recipes and food images," CVPR, DOI: 10.1109/CVPR.2017.327, Honolulu, HI, USA (Jul. 21-26, 2017).
Schroff, Florian, et al., "Facenet: A unified embedding for face recognition and clustering," CVPR, DOI: 10.1109/CVPR.2015.7298682, Boston, MA, USA (Jun. 7-12, 2015).
Schultz, Matthew, et al., "Learning a distance metric from relative comparisons," NIPS (2003).
Shih, Yong-Siang, et al., "Compatibility Family Learning for Item Recommendation and Generation," http://arxiv.org/abs/1712.01262 (Dec. 2017).
Silver, Dena, "Amazon's Echo Look Is Basically a Personal Stylist," http://observer.com/2017/04/amazon-echo-look-fashion-technology/, (Apr. 26, 2017).
Simo-Serra, Edgar, et al., "Fashion style in 128 floats: joint ranking and classification using weak data for feature extraction," Proc., IEEE CVPR, DOI: 10.1109/CVPR.2016.39, Las Vegas, NV, USA, (Jun. 27-30, 2016).
Simo-Serra, Edgar, et al., "Neuroaesthetics in fashion: Modeling the perception of fashionability," CVPR, DOI: 10.1109/CVPR.2015.7298688 (Oct. 15, 2015).
Singh, Krishna Kumar, et al., "End-to-end localization and ranking for relative attributes," ECCV, DOI: 10.1007/978-3-319-46466-4_45, Amsterdam, the Netherlands, pp. 753-769 (Oct. 11-14, 2016).
Song, Yang, et al., "Learning unified embedding for apparel recognition," ICCV Workshops, DOI: 10.1109/ICCVW.2017.262, Venice, Italy (Oct. 22-29, 2017).
Stitch Fix, Stitch Fix. http://www.stitchfix.com (2017).
Szegedy, Christian, et al., "Rethinking the inception architecture for computer vision," CVPR, DOI: 10.1109/CVPR.2016.308 (2016).
Tautkute, Ivona, et al., "DeepStyle: Multimodal Search Engine for Fashion and Interior Design," IEEE Access, http:/arxiv.org/abs/1801.03002 (Jan. 2018).
Tsujita, Hitomi, et al., "Complete fashion coordinator: a support system for capturing and selecting daily clothes with social networks," Proc. AVI, Rome, Italy (May 25-29, 2010).
Vaccaro, Kristen, et al., "Designing the Future of Personal Fashion," Proceedings of the 2018 CHI Conference on Human Factors in Computing Systems (CHI '18), ACM, New York, NY, USA, Article 627, 11 pages. https://doi.org/10.1145/3173574.3174201 (Apr. 21-26, 2018).
Vaccaro, Kristen, et al., "The Elements of Fashion Style," Proc. UIST., http://dx.doi.org/10.1145/2984511. 2984573, Tokyo, Japan (Oct. 16-19, 2016).
Van Der Maaten, Laurens, et al., "Visualizing high-dimensional data using t-SNE," JMLR 9, pp. 2579-2605 (Nov. 2008).
Vartak, Manasi, et al., "CHIC: a combination-based recommendation system," Proc. SIGMOD, pp. 981-984, New York, NY, USA (Jun. 22-27, 2013).
Vasileva, Mariya I., el al., "Learning Type-Aware Embeddings for Fashion Compatibility," Proc. ECCV, pp. 390-405 (2018).
Veit, Andreas, et al., "Conditional similarity networks," CVPR, DOI: 10.1109/CVPR.2017.193, (Jul. 2017).
Veit, Andreas, et al., "Learning visual clothing style with heterogeneous dyadic co-occurrences," Proc. ICCV. pp. 4642-4650 (2015).

(56) References Cited

OTHER PUBLICATIONS

Vittayakorn, Sirion, et al., "Runway to realway: visual analysis of fashion," Proc. WACV (2015).

Watson, Sara, "Data Doppelgangers and the Uncanny Valley of Personalization," https://www.theatlantic.com/technology/archive/2014/06/data-doppelgangers-and-the-uncanny-valley-of-personalization/372780/ (Jun. 16, 2014).

Wu, Chao-Yuan, et al., "Sampling matters in deep embedding learning," ICCV, DOI: 10.1109/ICCV.2017.309 (Oct. 2017).

Xiao, Han, et al., "Ssp: Semantic space projection for knowledge graph embedding with text descriptions," AAAI, pp. 3104-3110 (Feb. 2017).

Xu, Anbang, et al., 2017. "A New Chatbot for Customer Service on Social Media," Proc. CHI 2017, pp. 3506-3510, Denver, CO, USA (May 6-11, 2017).

Yamaguchi, Kota, et al., "Mix and match: Joint model for clothing and attribute recognition," BMVC, DOI: 10.5244/C.29.51, pp. 51.1-51.12 (Sep. 2015).

Yu, Aron, et al., "Fine-Grained Visual Comparisons with Local Learning," CVPR, DOI: 10.1109/CVPR.2014.32 (Sep. 2014).

Yu, Aron, et al., "Just noticeable differences in visual attributes," ICCV, DOI: 10.1109/ICCV.2015.278 (Dec. 2015).

Yu, Aron, et al., "Semantic jitter: Dense supervision for visual comparisons via synthetic images," ICCV, Venice, Italy, DOI: 10.1109/ICCV.2017.594 (Oct. 22-29, 2017).

Yu, Lap-Fai, et al., "DressUp! outfit synthesis through automatic optimization," In Proc. SIGGRAPH Asia, ACM Trans. Graph, vol. 31, No. 6, Article 134, 14 pages, http://doi.acm.org/10.1145/2366145.2366153 (Nov. 2012).

Zhao, Bo, et al., "Memory-augmented attribute manipulation networks for interactive fashion search," CVPR, Honolulu, HI, USA, DOI: 10.1109/CVPR.2017.652 (Jul. 21-26, 2017).

Zhu, Shizhan, et al., "Be your own prada: Fashion synthesis with structural coherence," ICCV (Oct. 2017).

Zhuang, Bohan, et al., "Fast training of triplet-based deep binary embedding networks," CVPR, DOI: 10.1109/CVPR.2016.641, Las Vegas, NV, USA (Jun. 27-30, 2016).

Solomon, Michael R., "The Wardrobe Consultant: Exploring the Role of a New Retailing Partner," Journal of Retailing 63(2) 110-128 (1987).

Al-Halah, Z., et al., "Fashion forward: Forecasting visual style in fashion," In: ICCV (2017).

Bell, Sean, et al., "Learning visual similarity for product design with convolutional neural networks," ACM Trans. on Graphics (SIGGRAPH) 34(4) (2015).

Blum, Sam, "Amazon's Newest Feature Gives You Fashion Advice from a Real Stylist," https://www.thrillist.com/news/nation/amazon-prime-outfit-compare-judges-your-outfits-for-you, (Mar. 18, 2017).

Bromley, Jane, et al., "Signature verification using a 'siamese' time delay neural network," In: IJPRAI pp. 737-774, (1993).

Chang, Yuh-Fang "How to say no: An analysis of cross-cultural difference and pragmatic transfer," Language Sciences, vol. 31., No. 4, pp. 477-493 (Jul. 2009).

Chen, Huizhong, et al., "Describing clothing by semantic attributes," In: ECCV 2012, Part III, LNCS 7574, pp. 609-623 (2012).

Chen, Qiang, et al., "Deep domain adaptation for describing people based on fine-grained clothing attributes," In: CVPR, Boston, MA, USA (Jun. 7-12, 2015).

Chu, Maurice, et al., "Countertop Responsive Mirror: Supporting Physical Retail Shopping for Sellers, Buyers and Companions," CHI 2010: Going to the Mall: Shopping and Product Design, Atlanta, GA, USA, pp. 2533-2542 (Apr. 10-15, 2010).

Corbiere, Charles, et al., "Leveraging weakly annotated data for fashion image retrieval and label prediction" In: ICCV Workshops (Sep. 27, 2017).

Cremonesi, Paolo, et al., "Dynamic and Interactive Lighting for Fashion Store Windows," CHI 2016: Late-Breaking Work: Interaction in Specific Domains, San Jose, CA, USA, pp. 2257-2263 (2016).

Dalmia, Ayushi, et al., "Styling with Attention to Details," https://deepai.org/publication/styling-with-attention-to-details (Jul. 3, 2018).

Deng, Jia, et al., "Imagenet: A large-scale hierarchical image database," In: CVPR, DOI: 10.1109/ CVPR.2009.5206848, Miami, FL, USA (Jun. 20-25, 2009).

Devendorf, Laura, et al., "I Don't Want to Wear a Screen: Probing Perceptions of and Possibilities for Dynamic Displays on Clothing," CHI, San Jose, CA, USA (May 7-12, 2016).

Di, Wei, et al., "Style finder: Fine-grained clothing style detection and retrieval," In: CVPR Workshops, DOI: 10.1109/CVPRW.2013.6, pp. 8-13 (Jun. 23-28, 2013).

Dougher, Kelly, "You're Doing the 'Capsule Wardrobe' Wrong," https://fashionmagazine.com/fashion/youre-doing-the-capsule-wardrobe-wrong/ (Sep. 1, 2015).

Ferreria, Beatriz Quintino, et al., "A Unified Model with Structured Output for Fashion Images Classification," In Proc. of KDD (KDD Workshop on AI for Fashion), ACM, New York, NY, USA, 10 pages (2018).

Garcia, Noa, et al., "Dress like a star: Retrieving fashion products from videos," In: ICCV Workshops, DOI: 10.1109/ICCVW.2017.270, (Oct. 22-29, 2017).

Gomez, Lluis, et al., "Self-supervised learning of visual features through embedding images into text topic spaces," CVPR (2017).

Green, Adrienne, "The Pull of Personal Stylists in the Online-Shopping Era," https://www.theatlantic.com/business/archive/2016/07/personal-stylist-online-shopping-era/492491/ (Jul. 22, 2016).

Han, Xintong, et al., "Automatic Spatially-aware Fashion Concept Discovery," In Proc. ICCV (Aug. 3, 2017).

Han, Xintong, et al., "Learning fashion compatibility with bidirectional LSTMs," In: ACM MM, DOI: https://doi.org/10.1145/3123266.3123394, Mountain View, CA, USA (Oct. 23-27, 2017).

He, Kaiming, et al., "Deep residual learning for image recognition," In: CVPR, DOI: 10.1109/CVPR.2016.90, Las Vegas, NV, USA (Jun. 27-30, 2016).

He, Ruining, et al., "Learning compatibility across categories for heterogeneous item recommendation," International Conference on Data Mining, DOI: 10.1109/ICDM.2016.0116, Barcelon, Spain (Dec. 12-15, 2016).

Bardovi-Harlig, Kathleen, "Pragmatics and Language Teaching: Bringing Pragmatics and Pedagogy Together," Bouton, Lawrence F., Ed. Pragmatics and Language Learning, Monograph Series, vol. 7, p. 21-39 (1996).

He, Runing, et al., "Ups and downs: Modeling the visual evolution of fashion trends with one-class collaborative filtering," Proc. WWW 2016, (Apr. 11-15, 2016).

Hidayati, Shintami, et al., "What are the fashion trends in New York?," Proc. MM, Orlando, FL, USA, pp. 197-200, (Nov. 3-7, 2014).

Hsiao, Wei-Lin, et al., "Creating Capsule Wardrobes from Fashion Images," Proc. CVF and CVPR, http://arxiv.org/abs/1712.02662 (Dec. 2017).

Hsiao, Wei-Lin, et al., "Learning the Latent 'Look': Unsupervised Discovery of a Style-Coherent Embedding from Fashion Images," Proc. ICCV (2017).

Hisu, Paris (Pei-Ting), et al., "AllergyBot: A Chatbot Technology Intervention for Young Adults with Food Allergies Dining Out," Proc. CHI 2017, Denver, CO, USA, (May 6-11, 2017).

Huang, Ting-Hao (Kenneth), et al., "'Is there anything else I can help you with?': Challenges in Deploying an On-Demand Crowd-Powered Conversational Agent," Proc. HCOMP (2016).

Inoue, Naoto, et al., "Multi-Label Fashion Image Classification with Minimal Human Supervision," Proc. CVPR (2017).

Kakumanu, P., et al., "A survey of skin-color modeling and detection methods," Pattern Recognition 40, pp. 1106-1122, http://dx.doi.org/https://doi.org/10.1016/j.patcog.2006.06.010 (2007).

Kiapour, M. Hadi, et al., "Hipster wars: Discovering elements of fashion styles," ECCV, https://link.springer.com/chapter/10.1007/978-3-319-10590-1_31 (Sep. 2014).

Kiapour, M. Hadi, et al., "Where to buy it: Matching street clothing photos in online shops," ICCV, DOI: 10.1109/ICCV.2015.382, Santiago, Chile, (Dec. 7-13, 2015).

(56) References Cited

OTHER PUBLICATIONS

Klein, Benjamin, et al., "Fisher vectors derived from hybrid gaussian-laplacian mixture models for image annotation," CVPR (Jan. 24, 2015).

Kline, Susan L., et al., "On the art of saying no: The influence of social cognitive development on messages of refusal," Western Journal of Speech Communication, vol. 54, Issue 4, (Jun. 6, 1990).

Kumar, Ranjitha, et al., "An Experimentation Engine for Data-Driven Fashion Systems," Proc. AAAI Spring Symposium (2017).

Laenen, Katrien, et al., "Cross-modal search for fashion attributes," Proc. KDD Workshop on Machine Learning Meets Fashion. ACM. (2017).

Laenen, Katrien, et al., "Web Search of Fashion Items with Multimodal Querying," Proc. of the Eleventh ACM International Conference on WSDM, Marina Del Rey, CA, USA, pp. 342-350. https://doi.org/10.1145/3159652.3159716 (Feb. 5-9, 2018).

Lasecki, Walter S., "Chorus: a crowd-powered conversational assistant," Proc. UIST., St. Andrews, United Kingdom, http://dx.doi.org/10.1145/2501988.2502057, (Oct. 8-11, 2013).

Lee, Hanbit, et al., "Style2Vec: Representation Learning for Fashion Items from Style Sets," http://arxiv.org/abs/1708.04014 (Aug. 14, 2017).

Lees, Justin, "Ask me anything: AnzacLive chatbot brings WW1 hero Archie Barwick to life on Facebook Messenger," http://bit.ly/2nRxB0F (Jul. 20, 2016).

Li, Jingly, et al., "Confiding in and Listening to Virtual Agents: The Effect of Personality," Proc. IUI 2017-Trust, Limassol, Cyprus, (Mar. 13-16, 2017).

Li, Yuncheng, et al., "Mining fashion outfit composition using an end-to-end deep learning approach on set data," IEEE Trans. Multimedia 19(8), DOI: 10.1109/TMM.2017.2690144, pp. 1946-1955 (Mar. 30, 2017).

Liu, Christine M., et al., "Urbanhermes: Social Signaling with Electronic Fashion," Proc. CHI 2006, Montreal, Canada (Apr. 22-27, 2006).

Liu, Qiang, et al., "DeepStyle—Learning User Preferences for Visual Recommendation," Proc. SIGIR, http://dx.doi.org/10.1145/3077136.3080658, Shinjuku, Tokyo, Japan (Aug. 7-11, 2017).

Liu, Si, et al., "Hi, magic closet, tell me what to wear!," ACM MM, Nara Japan (Oct. 29-Nov. 2, 2012).

Liu, Ziwei, et al., "Deep fashion: Powering robust clothes recognition and retrieval with rich annotations," CVPR (2016).

Liu, Ziwei, et al., 2016. "Fashion landmark detection in the wild," Proc. ECCV (Aug. 10, 2016).

Long, Kiel, et al., "'Could You Define That in Bot Terms?': Requesting, Creating and Using Bots on Reddit," Proc. CHI., Denver, CO, USA (May 6-11, 2017).

\* cited by examiner

401

```
┌─────────────────────────────────────────────────────────┐
│ Generate, by executing an image embedder, a first pair  │
│ of vectors including prediction values for the          │──── 419
│ characteristic terms that describes the first image and │
│ the second image, respectively                          │
└─────────────────────────────────────────────────────────┘
                              │
                              ▼
┌─────────────────────────────────────────────────────────┐
│ Generate, by executing a text embedder, a second pair   │
│ of vectors including prediction values for the          │──── 421
│ characteristic terms based on match or similarity to    │
│ the first text and the second text, respectively        │
└─────────────────────────────────────────────────────────┘
                              │
                              ▼
┌─────────────────────────────────────────────────────────┐
│ Execute a first fully connected neural network layer    │
│ including a visual semantic loss algorithm to combine   │
│ the first pair of vectors with the second pair of       │──── 423
│ vectors into a third pair of vectors that most closely  │
│ approximates prediction values of the second set of     │
│ vectors, wherein the third pair of vectors include the  │
│ first vector for the first fashion item and the second  │
│ vector for the second fashion item.                     │
└─────────────────────────────────────────────────────────┘
```

FIG. 4D

TYPE

| TEXT QUERY | TOP 10 RELEVANT IMAGES | VISUAL/TEXT ACCURACY |
|---|---|---|
| top | | 0.80/1.00 |
| shoulder bag | | 1.00/0.80 |
| pump | | 0.90/1.00 |
| pant | | 1.00/0.90 |
| jacket | | 1.00/1.00 |
| earring | | 1.00/1.00 |

COLOR

| | | |
|---|---|---|
| burgundy | | 0.80/0.80 |
| black | | 0.95/1.00 |
| blush | | 0.80/0.60 |
| gray | | 1.00/0.80 |
| beige | | 0.75/0.20 |
| taupe | | 0.85/0.20 |

FIG. 6A

| TEXT QUERY | SHAPE/SILHOUETTE TOP 10 RELEVANT IMAGES | VISUAL/TEXT ACCURACY |
|---|---|---|
| long sleeve | | 1.00/0.70 |
| skinny leg | | 1.00/1.00 |
| flat | | 0.85/0.70 |
| wide leg | | 1.00/0.90 |
| ankle | | 0.80/0.90 |
| maxi | | 0.90/0.60 |

| TEXT QUERY | PATTERN/PRINT TOP 10 RELEVANT IMAGES | VISUAL/TEXT ACCURACY |
|---|---|---|
| striped | | 1.00/1.00 |
| leopard print | | 0.90/0.90 |
| color block | | 0.85/0.10 |
| polka dot | | 0.45/0.40 |
| plaid | | 1.00/0.60 |
| floral | | 1.00/0.40 |

FIG. 6C

TRIM/DETAIL

| | | |
|---|---|---|
| pleated | | 0.90/0.40 |
| belted | | 1.00/0.80 |
| frayed | | 0.85/0.60 |
| logo | | 0.95/0.30 |
| braided | | 1.00/0.40 |
| ruffled | | 0.85/0.10 |

BRAND

| | | |
|---|---|---|
| Gucci | | 0.80/0.30 |
| Chloé | | 0.75/0.50 |
| Valentino | | 0.90/0.50 |
| Jimmy Choo | | 0.80/0.30 |
| Christian Louboutin | | 0.85/0.90 |
| Burberry | | 0.65/0.20 |

FIG. 6D

For <u>evening gowns</u>, you can choose a maxi or midi dress with a plunging or asymmetric neckline and a fluted silhouette.

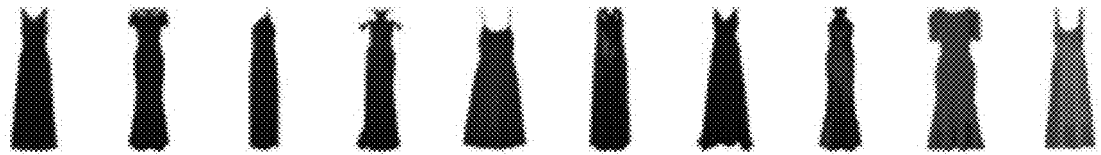

<u>Nautical tops</u> are usually made with cotton or linen and are known for their classic navy and white stripes.

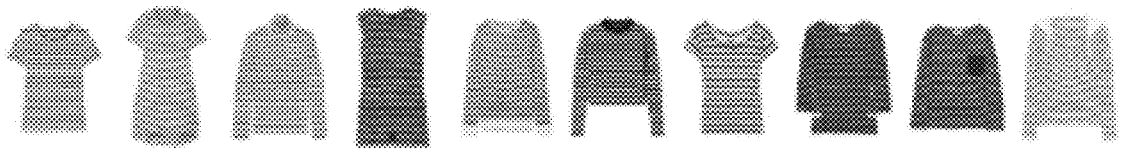

<u>Military pants</u> are typically olive colored and have straight-leg and tapered silhouettes.

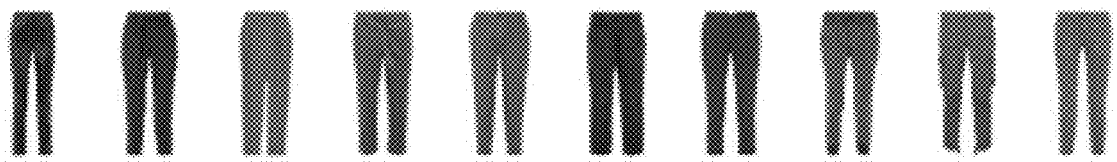

<u>Statement earrings</u> come in a variety of gold-tone and silver-tone drop styles, studded with sparkling stones, pearls, crystals, and more.

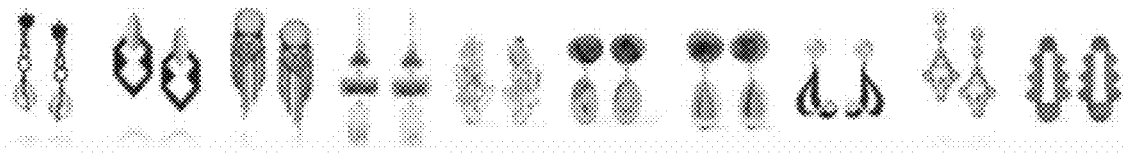

FIG. 7

ZIMMERMANN dresses > $1000

  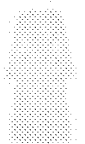  

ZIMMERMANN-style dresses < $500

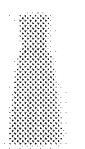   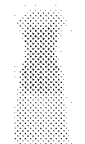 

needle & thread    self-portrait    self-portrait    self-portrait    REBECCA TAYLOR Zimmermann-styled dresses embrace the bohemian lifestyle with florals and tiered ruffles, and is ideal for breezy beach days.

BURBERRY coats > $2000

    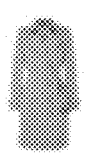

BURBERRY-style coats < $1000

    

MARC BY MARC JACOBS    A.P.C.    MARC BY MARC JACOBS       Theory

A classic Burberry-style trench coat is a clean choice for the winter, typically double-breasted and belted.

FIG. 8

MULTI-MODEL QUERY        GENERATED OUTFIT

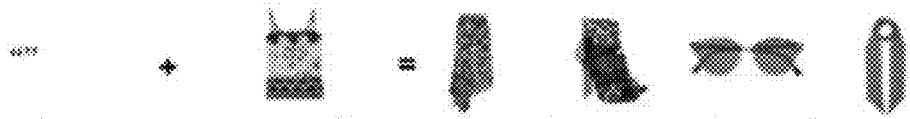

Striking patterns can be paired with cutout heels, luxe bronze eyewear, and a standout brown scarf.

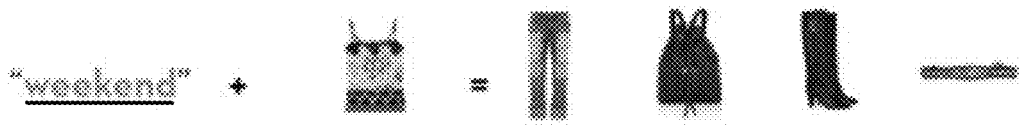

Paired with leather accessories, this weekend look is incomplete without a cropped blouse and distressed skinny jeans.

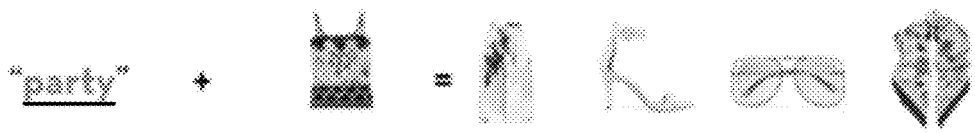

Celebrate with fun, bright prints and other eclectic pieces that make a bold statement at a party.

Dress up a plaid skirt with an off-white satin blouse, embellished with black ribbon and paired with sleek sunglasses.

Classic plaid, biker heels, and chic accessories create an edgy look to explore the city.

Create a comfortable workout outfit by layering lightweight sports gear with a signature scarf, ideal for cool weather.

FIG. 9

|  | TROPICAL SUMMER CAPSULE | WINTER CAPSULE |
|---|---|---|
| TOP | | |
| BOTTOM | | |
| OUTERWEAR | | |
| ALL BODY | | |
| FOOTWEAR | | |
| BAGS | | |
| EYEWEAR | | |
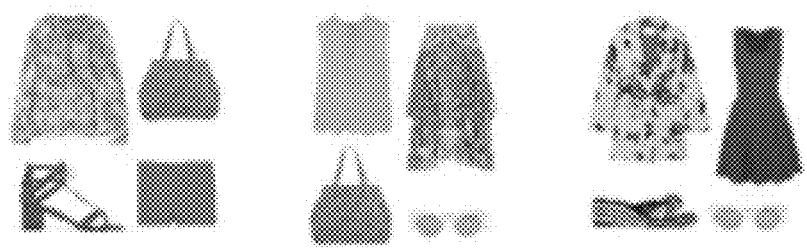
For a tropical summer vacation, pack playful, vibrant prints, and choose pieces like orange purses to add a playful pop of color.
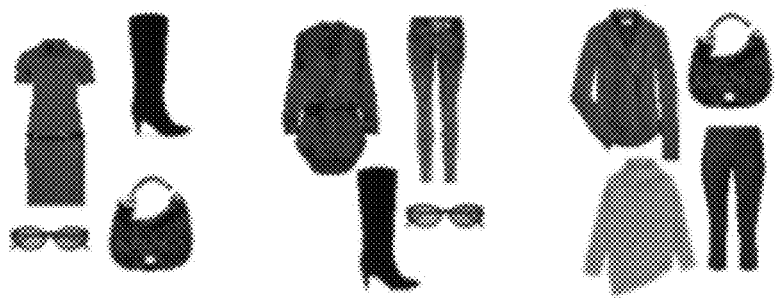
When packing for winter in downtown, pick knit or v-neck tops and layer with cashmere coverups and fitted boots.
FIG. 10

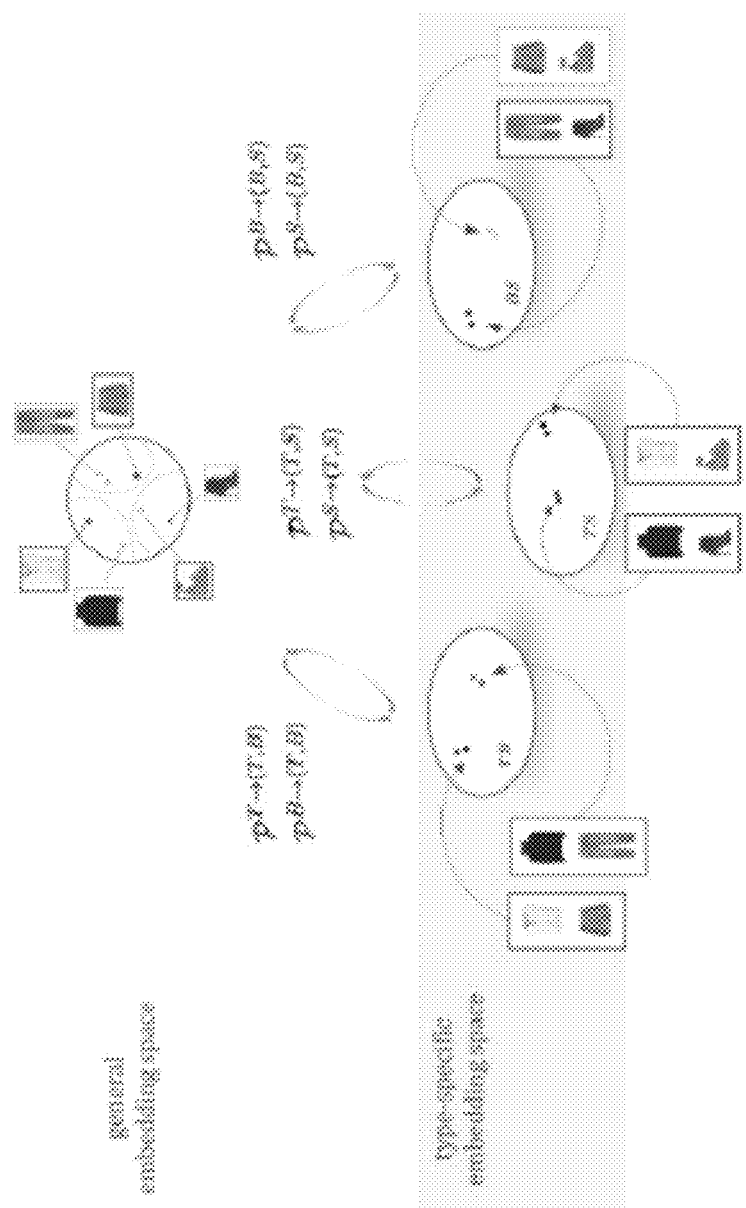
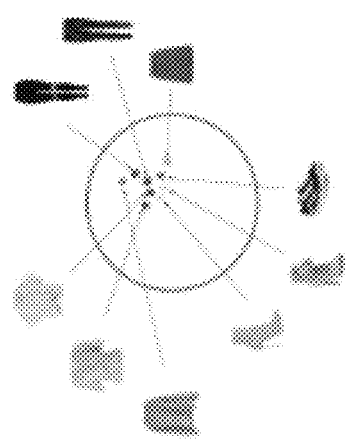
FIG. 11B
FIG. 11A

FIG. 12A
FIG. 12B

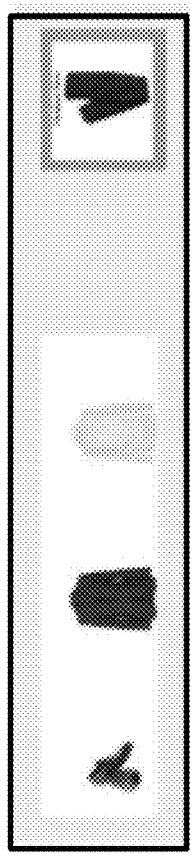
FIG. 17A
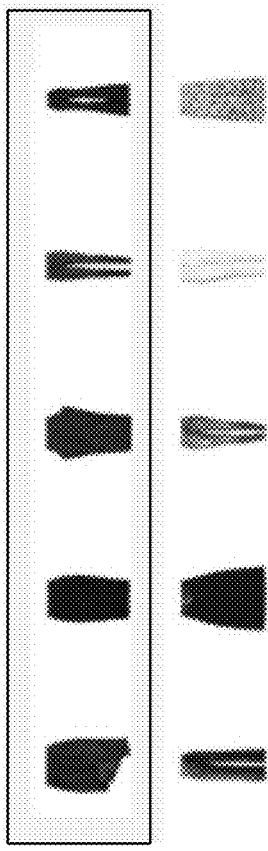
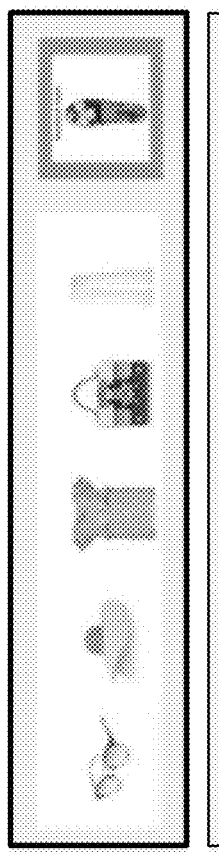
FIG. 17B
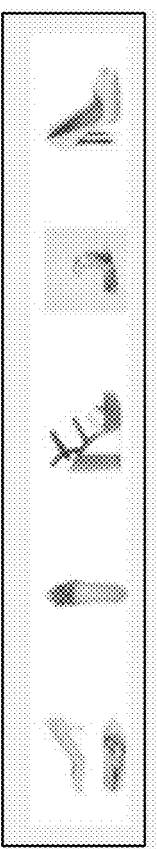
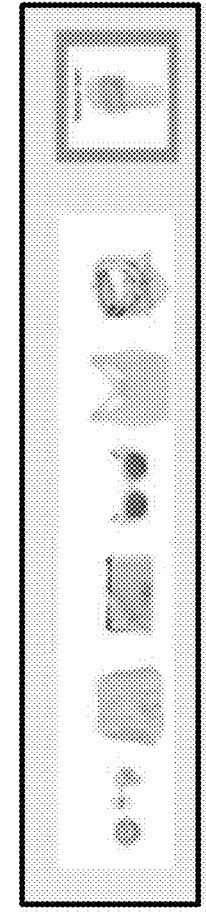
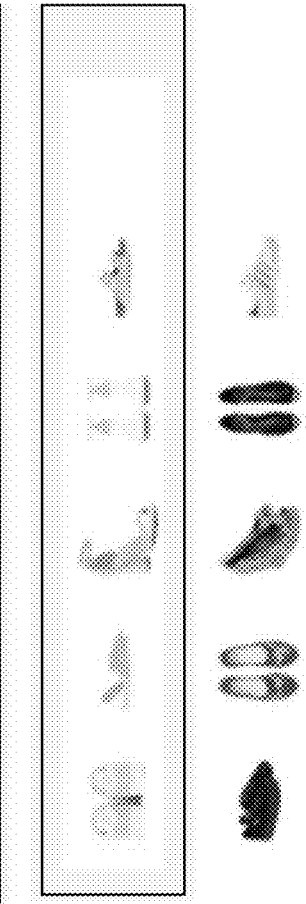
FIG. 17D
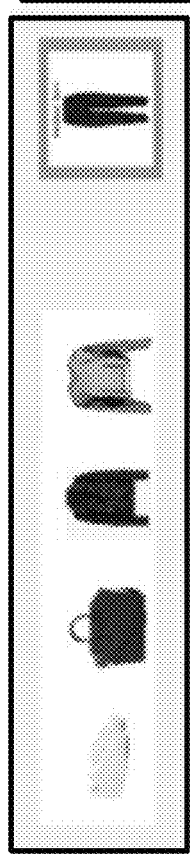
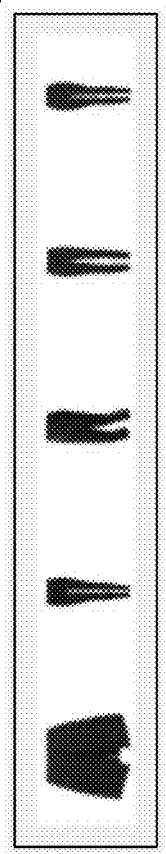
FIG. 17C

SEARCH ENGINE USE OF NEURAL NETWORK REGRESSOR FOR MULTI-MODAL ITEM RECOMMENDATIONS BASED ON VISUAL SEMANTIC EMBEDDINGS

REFERENCE TO EARLIER FILED APPLICATION

This application claims the benefit under 35 U.S.C. § 119(e) of U.S. Provisional Patent Application No. 62/823,512, filed Mar. 25, 2019, which is incorporated herein, in its entirety, by this reference.

TECHNICAL FIELD

Embodiments of the disclosure relate generally to providing search engine results, and more specifically, relate to a search engine use of neural network regressor for multi-modal item recommendations based on visual semantic embeddings.

BACKGROUND

People reason about fashion through vision and language. When searching for clothes and accessories, consumers naturally communicate their requirements visually, by showing similar products or items they want to match, and linguistically, describing the context they are trying to dress for or the style they wish to achieve. It is a hallmark of professional stylists that they both show and tell: presenting a recommendation to a client while simultaneously explaining why and how it satisfies their requirements.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIGS. 4C-4D are a flow chart of a method for providing search results of a compatible second fashion item based on an input of a first fashion item located on a first website, according to various embodiments.

FIGS. 6A, 6B, 6C, 6D are a series of graphs to illustrate the top 10 product items for the six selected terms from each of eight categories, accompanied by visual and text accuracies, according to various embodiments.

FIG. 7 is an example search results page in response to a style-based and a context-based query, according to various embodiments.

FIG. 8 is an example search results page in response to a same-look-for-less query, according to various embodiments.

FIG. 9 is an example search results page containing outfit completion in response style-based and context-based outfit queries, according to various embodiments.

FIG. 10 is an example search results page to provide a capsule wardrobe recommendation, according to various embodiments.

FIG. 11A is a chart of a conventional embedding strategy, which embeds objects of all types in one underlying space, according to some embodiments.

FIG. 11B is a set of charts to illustrate type-respecting embeddings, using "top," "bottom," and "shoes" as examples, according to an embodiment.

FIG. 12A is a graphic image to illustrate t-SNE of the learned general embedding space on Polyvore Outfits, according to an embodiment.

FIG. 12B is a graphic image to illustrate overlapping items for each cell of the highlighted four columns in FIG. 12A, according to an embodiment.

FIGS. 17A, 17B, 17C, and 17D is each a set of images of clothing items to exemplify item swaps and outfit diversification, according to various embodiments of the disclosed model.

DETAILED DESCRIPTION

By way of introduction, the present disclosure relates to employing machine learning by way of a neural network (NN) regressor to provide multi-modal search results to users. In one embodiment, a search engine server may perform visual semantic embedding of images in order to learn both item-based similarity (for example, when two tops are interchangeable) and compatibility (items of possibly different type that can go together in an outfit). A visual semantic embedding may be expressed as vectors mapped through a type-specific feature space also referred to herein as an embedding space that is sub-categorized by item type, which will be discussed in more detail. The feature space may be defined by a text lexicon of a number of characteristics (e.g., characteristic terms) that may be categorized in more general categories. More specifically, the search engine may apply a neural network regressor that maps a pre-existing image embedding of fashion product images to the text lexicon of 1300 fashion characteristics. The characteristics range from low-level fashion elements (such as type, color, material, and shape) to high-level fashion styles and contexts. While fashion may be viewed as a particular example of complex arrangements of products/items, e.g., being multifaceted with different arrangements of outfits and from perspectives of human perception, the proposed trained models herein may be applied to other genres of products in similar contexts, as would be apparent to those skilled in the art.

In various embodiments, the NN regressor learns an image-word mapping that mirrors human perception, allowing users to find, via queries of the search engine server, images of clothing from their text descriptions (and optionally an input image) and vice versa. In embodiments, the NN regressor can support a rich set of multi-modal fashion interactions, including style-based and context-based outfit recommendations, capsule wardrobe generation, "the-same-look-for-less" results, and more.

Accordingly, effective data-driven fashion interfaces within the search engine server may support multi-modal inputs and outputs, allowing users to query with images and text, and responding to queries with visual recommendations and textual explanations. Given the abundance of annotated fashion image data that may be found online, previous research has leveraged deep learning techniques to build models that support multi-modal input queries. However, because these models are generally trained on text corpora that are too sparse to capture the complex and evolving semantic relationships that exist in fashion, far less attention has been paid to multi-modal output: generating coherent linguistic justifications for a model's recommendations.

Figure 2:
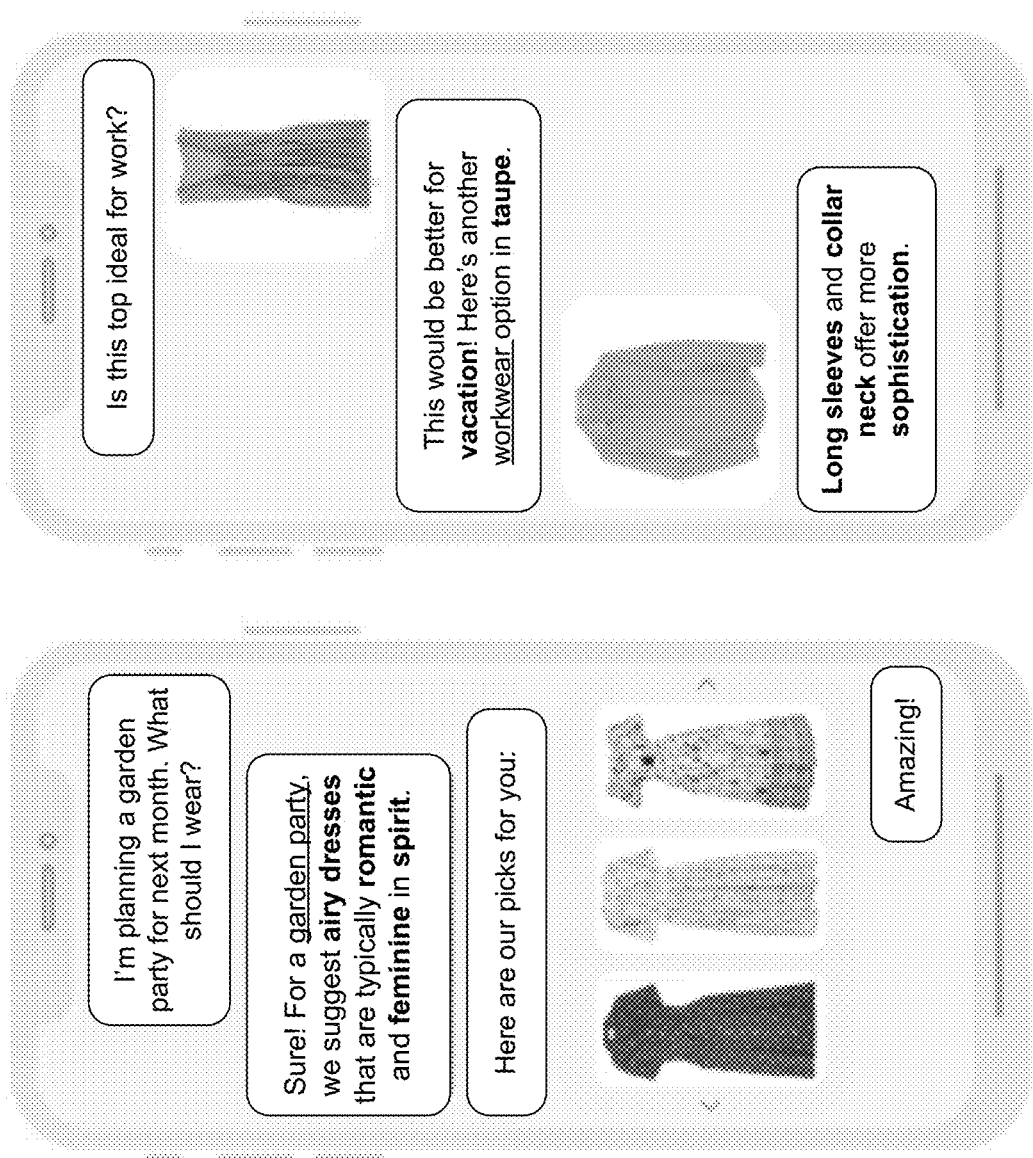
FIG. 2 illustrates an example of context-based product queries with stylists explanations, powered by a regression model, according to an embodiment.

In various embodiments, the output of the disclosed trained NN regressor includes a structured text representation that makes query results readily interpretable, and can facilitate interactions that provide explanations accompanying fashion recommendations. The structured text may form explanation(s) for delivery of a set of images in a set of search results. FIG. 2 illustrates an example of context-based product queries with stylist explanations, powered by a regression model, according to an embodiment. The underlined text corresponds to the query and the bolded text corresponds to the explanatory terms generated by the trained model.

Figure 1:
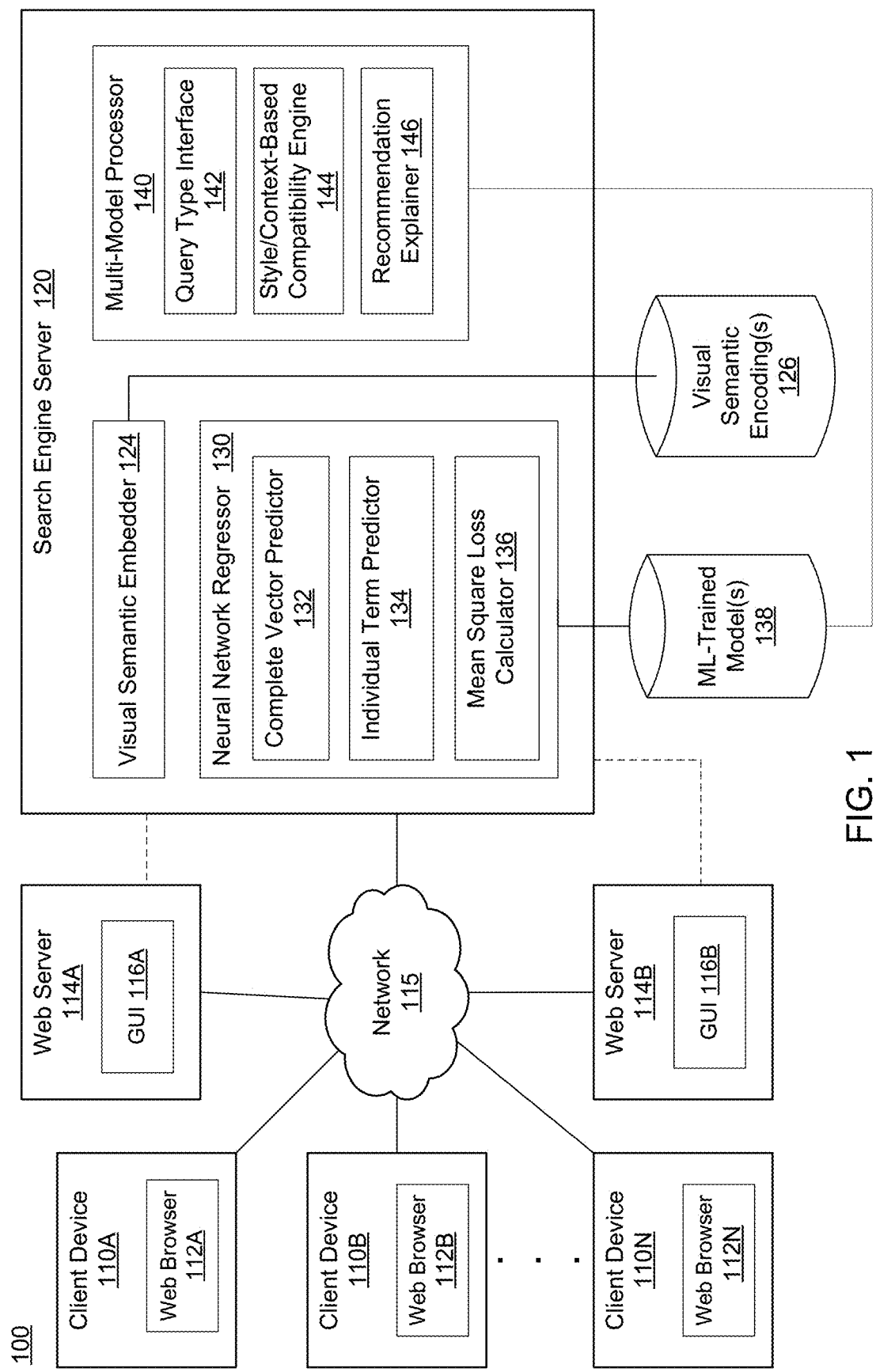
FIG. 1 is a block diagram of a system in which a search engine server is to use a neural network (NN) regressor for multi-modal fashion recommendations based on visual semantic embeddings, according to various embodiments.

FIG. 1 is a block diagram of a system 100 in which a search engine server 120 that is to use a neural network (NN) regressor 130 for multi-modal fashion recommendations based on visual semantic embeddings, according to various embodiments. The system 100 may further include one or more web servers 114A and 114B, which may be coupled to the search engine server 120 over a network 115, or may be integrated within the search engine server 120 (or other computing device) to provide a graphical user interface (GUI) 116A and 116B, respectively, for the search engine server.

The system 100 may further include multiple client devices 110A, 110B, . . . 110N communicatively coupled to the search engine 120 (and/or web server(s) 114A and 114B) over the network 115. Each client device 110A, 110B, . . . 110N may include a web browser 112A, 112B, . . . 112N, respectively, through which to access the GUI provided by the web server 114A through which to submit search queries and through which to receive search results.

In embodiments, the GUI 116A or 116B provided by the web server(s) 114A and 114B may include one or more prompt boxes through which to receive text, an upload option through which to submit an image, and one or more drop down (or other types of) menus with which to select a type of multi-modal search to perform. These types of multi-modal searches may include, for example, style-based and context-based outfit recommendations, capsule wardrobe generation, "the-same-look-for-less" results, and others, as will be discussed below.

The search engine server 120 may include, but not be limited to, a visual semantic embedder 124, visual semantic encoding(s) 126, a neural network (NN) regressor 130, a multi-modal processor 140, and one or more machine-learned (ML) model(s) 138, such as a NN regressor model for various fashion item types or categories as discussed herein. The training of the visual semantic embedder 124 that is to generate the visual semantic encoding(s) 126 will be discussed with reference to FIGS. 4A-4B. The NN regressor 130 may further include a complete vector predictor 132, an individual term predictor 134, and a mean square loss calculator 136, which will be discussed with reference to FIG. 4A, as part of use of the visual semantic embeddings (vectors) to train the NN regressor 130 to generate fashion-based recommendations and other multi-modals outputs.

In various embodiments, the multi-modal processor 140 interfaces with the Web server(s) 114A and/or 114B to execute a query type interface 142, a style-based and context-based compatibility engine 144, and a recommendation explainer 146. The query type interface 142 may provide users, via the web browsers on any number of the client devices 110A, 110B, . . . 110N, selection options to choose the type of query that the user wants to run. The style-based and context-based compatibility engine 144 may interact with the NN regressor 130 in providing search results to users that include fashion items and products that are compatible with each other and sufficiently match the style of the input query. The recommendation explainer 146 may further be trained to provide text-based explanations to go both with image and text-based search results, e.g., a structured text-based explanation of why the search results are relevant to a given single or multi-modal input. These explanations may help provide additional confidence to users that the recommendations make sense and would serve them well to employ in their outfit selection.

To train the regressor, a dataset of more than 75,000 fashion products was captured from Net-A-Porter, a popular online fashion retailer, mining the product images and accompanying text descriptions for each item. Through an iterative open encoding of frequently occurring unigrams, bigrams, and trigrams in the text descriptions, the search engine server 120 created a lexicon of 1,300 fashion characteristics broken down into eight categories: type, shape/silhouette, color, pattern/print, material, details/trim, brand, and style/context. Using this dataset, the search engine server 120 trains a two-layer neural network using a regression loss function over all 1,300 characteristics. Then, the search engine server 120 leverages these pre-trained layers to train one additional neuron per characteristic, allowing the disclosed model to capture fashion characteristics with only few representative examples in the training set. This architecture also makes the model extensible: as tastes change and fashion evolves, new characteristics can be added without having to retrain the entire network.

This disclosure will demonstrate that the NN regressor 130 learns an image-word mapping that closely mirrors human perception, allowing users to find images of clothing from their text descriptions and vice versa. The NN regressor 130 is also able to learn complex characteristics with very little training data. Finally, the trained NN regressor is combined with an image-based fashion compatibility model in order to demonstrate a rich set of fashion interactions with multi-modal inputs and outputs, including style-based and context-based outfit recommendations, "the same look for less," and capsule wardrobe generation. No prior work has emphasized the importance of categorizing the characteristics in the fashion domain. The disclosed method of fashion characteristic extraction is based on a structured lexicon, allowing the search engine server 120 to provide explanations by leveraging different categories of characteristics.

For training fashion characteristics extraction model, acquiring accurate and complete labeling is difficult. Some works labeled the dataset through human annotation with a limited number of learning targets, while others learned styles through unsupervised approaches. Many works identified the challenge of incomplete and noisy labeling introduced by inferring training labels from meta-data related to fashion products. One work analyzed the label uncertainty problem and proposed a solution using Kullback-Leibler divergence loss. The disclosed work herein addresses the incomplete labeling problem using a regression network and proposes a new training procedure that increases the performance on under-presented fashion characteristics.

To create a mapping between the vision-based and text-based spaces of fashion, one is to first define a lexicon of fashion characteristics. The disclosed work is based around a lexicon of eight categories, each corresponding to different group of characteristics in the fashion domain: types of item (e.g., pants), colors (e.g., blue), materials/textures (e.g., silk), shapes (e.g., sleeved), brands (e.g., Burberry), trims/details (e.g., pleated), pattern/prints (e.g., stripe), and styles (e.g., beach). Additional categories are envisioned and these are listed merely by way of example. A term in the lexicon may be assigned to one or multiple categories. For example, gold can both be a color and a material. Having domain-specific vocabularies helps distinguish different contexts a word can be used in; for example, shapes and materials can only apply to a single item while styles usually refer to outfits.

Figure 3:
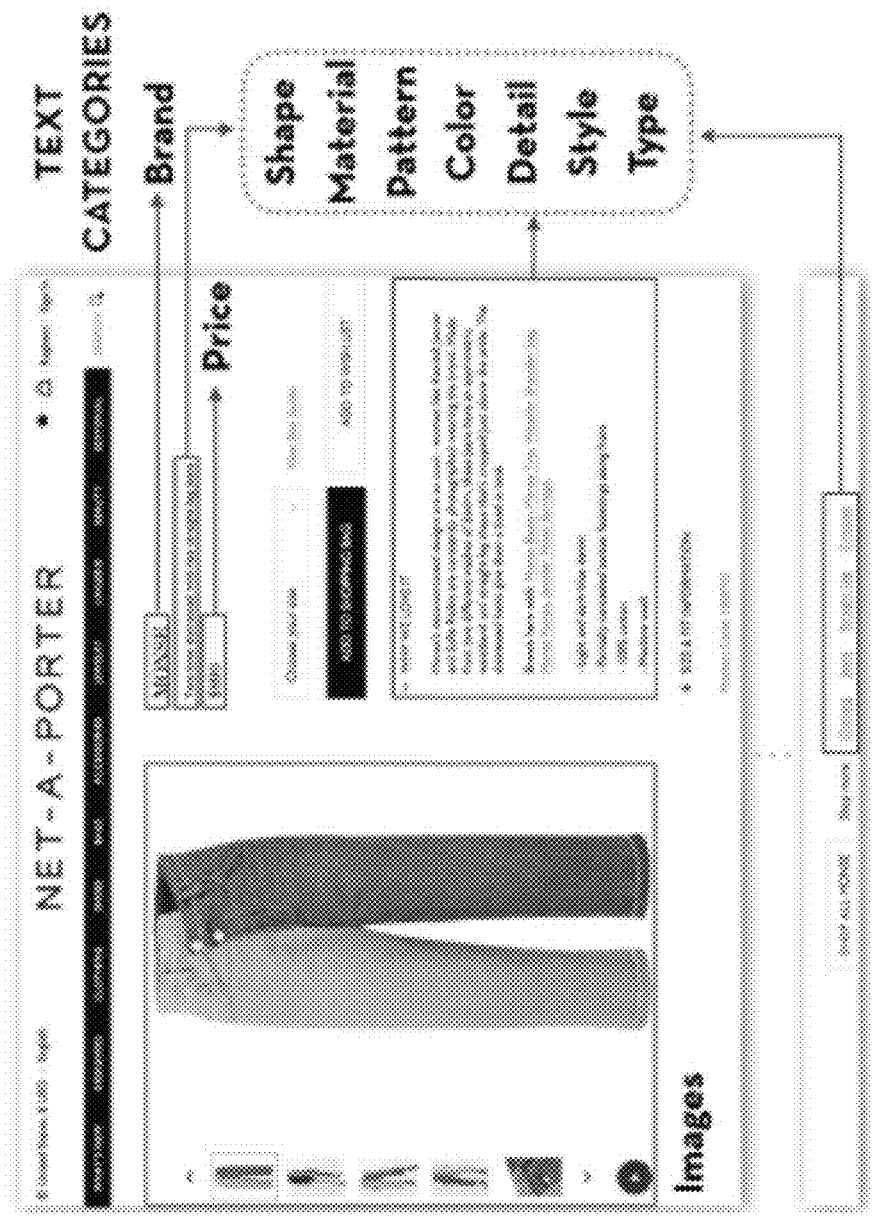
FIG. 3 illustrates a product item on Net-A-Porter and how the search engine server retrieves the meta-data and maps the meta-data to different categories, according to an embodiment.

FIG. 3 illustrates a product item on Net-A-Porter and how the search engine server 120 retrieves the meta-data and maps the meta-data to different categories, according to an embodiment. The search engine server 120 mined a new fashion dataset from the Net-A-Porter online retail website, which contains a total of 78,995 fashion products. Using the text extracted from product metadata, the search engine server 120 performed a multi-step iterative approach to fill in the lexicon with vocabularies.

First, the search engine server 120 adds all the brand names extracted from the brand field into the lexicon. Then, the search engine server 120 extracts vocabularies from the name, description, website category, and editor notes field in the dataset and sorted the vocabularies by frequency. The search engine server 120 also computes bigrams and trigrams and sorts them based on point-wise mutual information ("PMI"). Inventors manually label the vocabularies starting from the more frequent ones to the less frequent ones to increase the chance of covering popular fashion characteristics. Inventors also manually go through each term and determined the appropriate categories. The terms that apply to none of the categories in the lexicon are kept, to indicate that they have been examined. All the unigrams with at least 200 occurrences are maintained in the dataset and the top 200 bi-grams and tri-grams based on PMI. A final lexicon set of terms includes 3,418 unique terms in total, with 445 styles, 421 types, 207 shapes, 150 materials, 97 trims, 107 colors, 42 patterns, and 1553 brands. The 3,418 terms consist of 2,209 unigrams, 891 bi-grams, 219 tri-grams, 78 quad-grams, 8 five-grams, 5 six-grams and 2 seven-grams.

To take advantage of the structured lexicon, a model is developed that translates image features into defined fashion characteristics. Work on vision-based fashion modeling has been extended to also include fashion context and support text-based queries. Using the data mined from Net-A-Porter, the search engine server 120 trained the NN regressor 130 to learn the association between product images and fashion characteristics as described by the developed lexicon. To capture the high-level features of an image that appropriately represents the visual attributes of the product, the search engine server 120 computes, for a visual semantic embedding of each product, by following the procedure that will be discussed with reference to FIG. 4B. To enable direct queries through text, the search engine server 120 trained the NN regressor 130 to describe the fashion characteristics embedded in the vector space. The model takes a vector in the visual semantic embedding space as input and outputs an association score for each characteristic the search engine server 120 trained on.

To create this type of lexicon from our data, inventors selected 1300 terms from a total of 3,418 terms, which were obtained after preprocessing the meta-data information that was scraped for each product, including but not limited to: type, color, brand, category, and title. This preprocessing step included lowercasing terms, removing punctuation, and filtering out terms with less than 50 occurrences in the training set. To create the training and test sets, the dataset was randomly split to contain 55,670 (85%) and 9212 (15%) items respectively. The final lexicon includes 1108 unigrams, 134 bi-grams, 45 tri-grams, 11 quad-grams, one penta-gram, and one septa-gram, and contained 136 types, 120 materials, 305 brands, 418 styles, 68 colors, 37 patterns, 84 trims and 151 shapes.

Figure 4A:
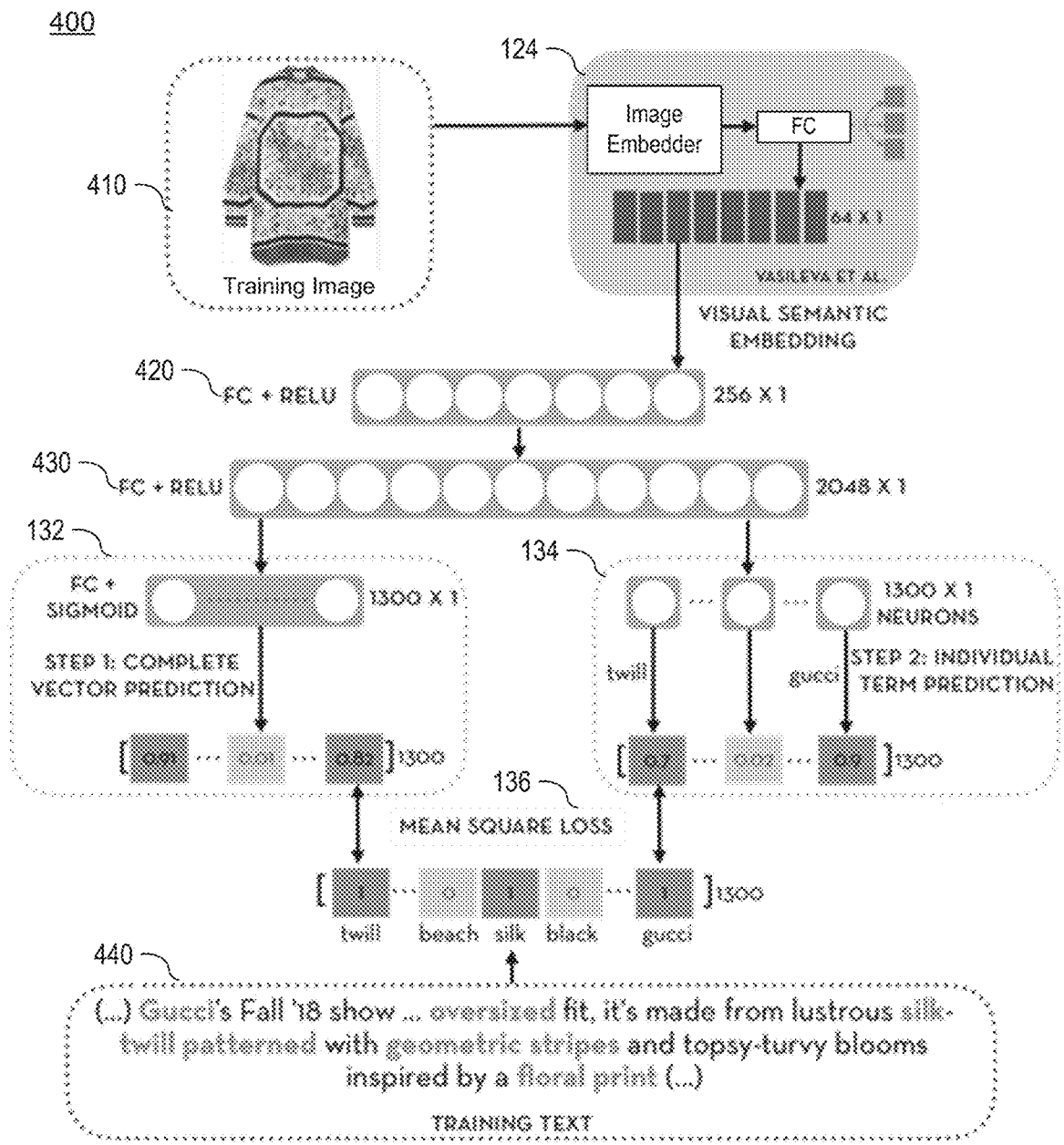
FIG. 4A is a flow chart to illustrate a neural network regression flow use of visual semantic embeddings that employs a two-step training procedure, according to an embodiment.

FIG. 4A is a flow chart 400 to illustrate a neural network regression flow use of visual semantic embeddings that employs a two-step training procedure, according to an embodiment. As illustrated, the NN regressor model may be trained with use of a multi-layer neural network. As pre-processing steps, the search engine server 120 receives an input image 410 on which to train, which is submitted to the visual semantic embedder 124 (FIG. 1) in order to generate a visual semantic embedding for the input image 410. The search engine server 120 also receives, as an input, a group of words that represent labels describing the product represented by the input image 410 using the terms in the developed lexicon, which was discussed above. In one embodiment, the NN regressor model computes the visual semantic embedding based on a visual-semantic loss between a text-based image embedding of the input image and features represented within the group of words, as will be discussed in more detail with reference to FIG. 4B.

The multi-layer neural network may further include a first fully connected layer (FC) and rectifier linear unit (ReLU) 420 and a second FC and ReLU 430, which feeds two separate processing layers, namely the complete vector predictor 132 and the individual term predictor 134, which may be executed in parallel in one embodiment. More specifically, the second FC and ReLU 430 (or an additional and final sets of full connected NN layer and rectifier linear unit layers) may output intermediate NN vector outputs that become inputs into the complete vector predictor 132 and the individual term predictor 134.

The NN regressor 130 may train a NN regressor model on a regression task of predicting the appropriate lexicon to describe an image through a two-step procedure using the Adam optimizer and mean square loss. The Adam optimizer is a replacement optimization algorithm for stochastic gradient descent for training deep learning models. The Adam optimizer may iteratively update initialized values of individual neurons to generate a neural network that minimizes a loss function. The Adam optimizer may combine the best properties of the AdaGrad and RMSProp algorithms to provide an optimization algorithm that can handle sparse gradients on noisy training problems. Training on a regression task discounts sharp penalties on wrong predictions, implicitly handling the lack of complete, exhaustive labeling for each product in the fashion domain.

In various embodiments, the first step may be for the two FC and ReLU (e.g., hidden) layers to feed the intermediate NN vector outputs to the complete vector predictor 132 (FIG. 1), which include a FC and sigmoid activation layer of a size one by 1,300 (e.g., a width equal to a number of the characteristic terms) and which is trained over 10 epochs. In this step, this last FC and sigmoid activation layer is to predict the complete text vector corresponding to the product represented in the input image 410. The complete text vector may include a subset of the characteristic terms of the text lexicon of item characteristics that are predicted as a group. The subset of characteristic terms may together best describe the training image 410, where the sigmoid activation layer outputs prediction values for each term in the subset of the characteristic terms that, when combined, result in the highest predictive value for the subset. This step may allow the NN's hidden layers to capture meaningful characteristics and develop a good internal representation from the visual semantic embedding. In some embodiments, when predicting with the complete vector predictor 132 that predicts the subset of the characteristic terms all at once, there is a higher likelihood of mispredicting one or more of the terms with reference to the input image 410. The misprediction, for example, may be generating too high a correlation value for a term that is not descriptive of the image or generating too low a correlation value for a term that is descriptive of the image.

In one embodiment, a sigmoid activation layer employs a sigmoid activation function to outputs of each neuron exiting a previous NN layer. The sigmoid function is an activation function in terms of underlying gate structured in co-relation to neurons firing in neural networks. The derivative also acts to be an activation function in terms of handling neuron activation in terms of NN's. The differential between the two is activation degree and interplay.

In the second step, the search engine server 120 may stop training with the two hidden layers, e.g., the first and second FC and ReLU layers 420 and 430, and connect the last layer (e.g., the second FC and ReLU layer 430) to 1,300 individual neurons with separate sigmoid activations, where each neuron predicts a specific characteristic term by using the individual term predictor 134. The search engine server 120 may then separately train each individual characteristic for one epoch with resampled training data that has the same number of positive and negative samples. The individual term predictor 134, in order words, includes numerous neurons (e.g., 1300 in this example), each with a corresponding sigmoid activation, where each neuron of the numerous neurons is separately trainable for a respective individual term (e.g., characteristic term) corresponding to the input image. Training the individual neurons and resampling the data allows neurons for characteristics with low frequencies to also output high activations in cases where the characteristic is present. In some embodiments, at least one of the complete vector predictor or the individual term predictor employs a replacement optimization algorithm for stochastic gradient descent associated with deep learning, such as the Adam optimizer for example, which was discussed.

In embodiments, the mean square loss calculator 136 may then calculate a number for each of the 1,300 terms in the lexicon. To do so, the mean square loss calculator 136 may receive an overall vector with values for each of the 1,300 terms as predicted by the complete vector predictor 132 layers. The mean square loss calculator 136 may then subtract, from the overall vector, the individual values received for each of the 1,300 terms generated by epochs of training the individual term predictor 134, square the differences, and then sum them up. In this way, the terms of the 1,300 words are given either a "1" or a "0" based on the prediction by the trained NN regressor 130. The search engine server 120 may also output training text 440, which includes the relevant words from the input (training) image 410, against which accuracy of the output predictions can be determined.

This two-step training procedure not only allows for more robust prediction of low-frequency terms (e.g., terms that are infrequently used but are nonetheless descriptive and helpful), but also allows ready introduction of new terms without having to update the entire neural network, increasing the flexibility of the NN regressor model. To add a new term, one only is to add a new one-by-one output NN layer connected to the last hidden layer, and train that single layer as per the second step.

In one embodiment, the search engine server 120 includes a communication interface (such as communication interface 1836 in FIG. 18) through which to receive a multi-modal query from a browser of a client device, the multi-modal query including at least a first image of an item. A processing device coupled to the communication interface may execute a neural network (NN) regressor model on the first image to identify multiple second items that are one of similar to or compatible with the item depicted in the first image. A set of images may correspond to the plurality of second items. The processing device may further generate structured text that explains, within one of a phrase or a sentence, why the plurality of second items are relevant to the item. The processing device may further return, to the browser of the client device via the communication interface, a set of search results comprising the set of images and the structured text.

In further embodiment, the multi-modal query further includes one or more word that stylistically describes the first image. To generate the structured text, the processing device is further to: determine a top number of most associated items of the plurality of second items; compute, using a sigmoid activation layer, an average activation score for each characteristic term, in a text lexicon, associated with each respective second item of the top number of most associated items; determine a subset of the characteristic terms that have a highest average activation score; and employ the subset of the characteristic terms within the structured text that forms explanations for delivery of the set of images in the set of search results.

In a related embodiment, to determine the top number of most associated items, the processing device is further to: compute a visual semantic embedding of each second item of the plurality of second items, the visual semantic embedding comprising feature vectors mapped within a type-specific feature space; compute association scores for the one or more word of the multi-modal query via comparison of the one or more word to each respective visual semantic embedding; and return a subset of the second items that have the highest association scores as the top number of most associated items of the plurality of second items.

Figure 4B:
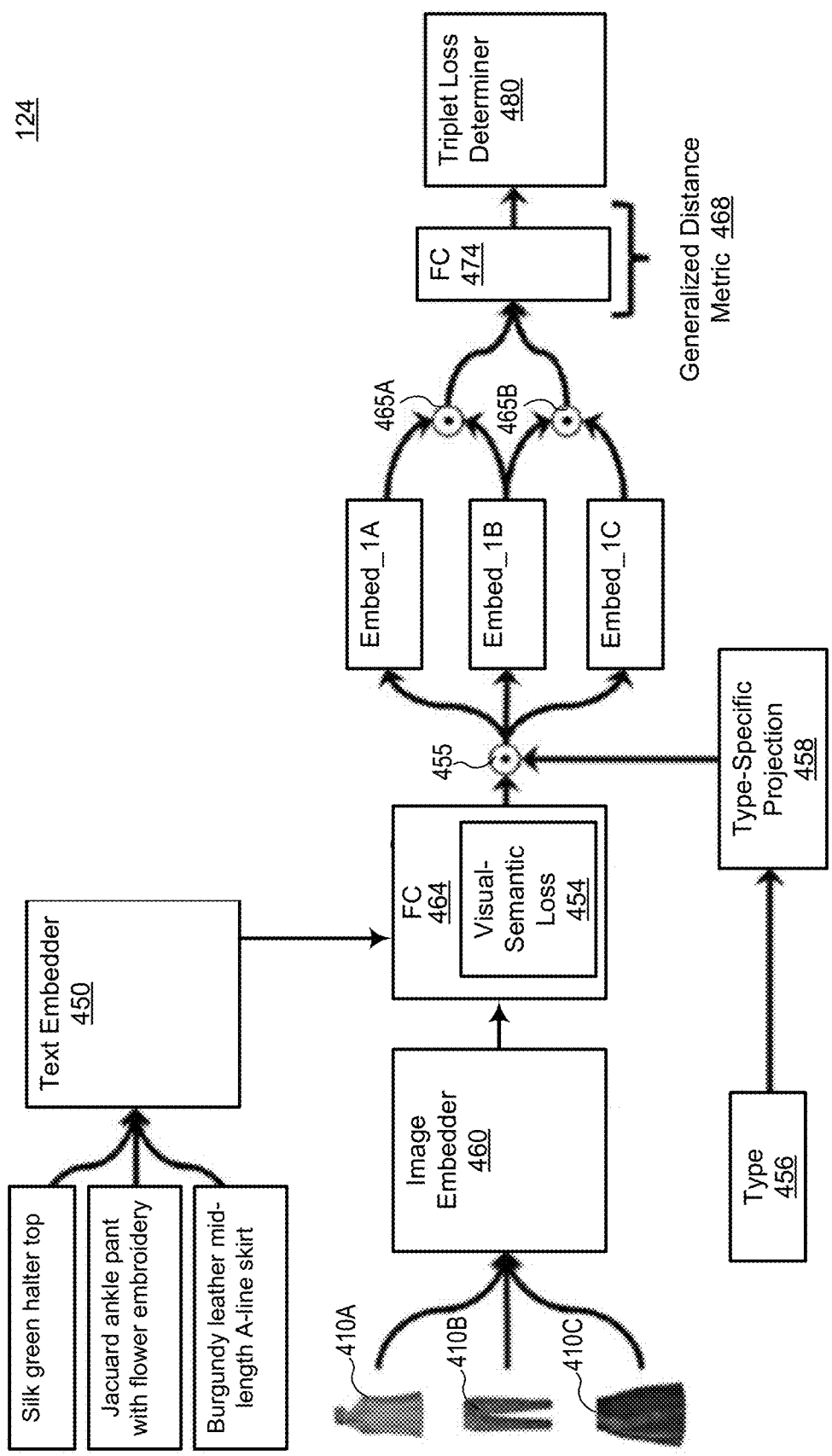
FIG. 4B is a block diagram of components, and their interactions, within the visual semantic embedder of the search engine server (FIG. 1), to generate visual semantic embeddings of images according to various embodiments.

FIG. 4B is a block diagram of components, and their interactions, within the visual semantic embedder 124 of the search engine server 120 (FIG. 1), to generate visual semantic embeddings of images according to various embodiments. In embodiments, the visual semantic embedder 124 may include a text embedder 450 and an image embedder 460, which the visual semantic embedder 124 may use to encode each image in a general embedding space of feature vectors. In various embodiments, the visual semantic embedder 124 selects several images from online site(s) (or other sources), which for the present examples, are images of fashion items in order to determine whether the corresponding items would be compatible in an outfit, e.g., worn with each other.

In some embodiments, the visual semantic embedder 124 feeds at least two (three illustrated here by way of example, e.g., a first image 410A, a second image 410B, and a third image 410C) of the retrieved images to the image embedder 460. The image embedder 460 may perform neural network processing on the images to predict characteristic terms that are most descriptive of the corresponding items, e.g., here respectively a top depicted in the first image 410A, a pair of pants (or just "pants") depicted in the second image 410B, and a skirt depicted in the third image 410C. The output of the image embedder 460 may therefore be a first set of vectors, one for each image, that corresponds to the text lexicon, which includes predictive values for each of the characteristic terms in the text lexicon. The image embedder 460 may output the first set of vectors (e.g., an image embedding), one for each of the input images, into a fully connected layer 464 of neural networking processing.

In associated embodiments, the visual semantic embedder 124 scrapes metadata from or associated with each of the images 410A, 410B, and 410C selected from the online site(s) to retrieve text that is descriptive of each of the images. For purposes of explanation, the descriptive text may be "silk green halter top" for the first image 410A, "jacquard ankle pant with flower embroidery" for the second image 410B, and "burgundy leather mid-length A-line skirt" for the third image 410C. The visual semantic embedder 124 may then input the descriptive text into the text imbedder 450. The text embedder 450 may, based on analysis of these text descriptions in relation to the characteristic terms, generate a second set of vectors, one for each of the images 410A, 410B, and 410C that corresponds to the text lexicon. The text embedder 450 may output the second set of vectors (e.g., a text embedding) to the full connected layer 464 of the neural networking processing.

In some embodiments, the fully connected layer 464 of neural network processing may employ a visual-semantic loss algorithm 454 that together performs training in which the first set of vectors (or image embedding) is combined with the second set of vectors (or text embedding) in a way that most closely approximates values in the second set of vectors. The visual-semantic loss 454 may determine differences between prediction values for the characteristics terms of the first set of vectors compared to the second set of vectors. The visual semantic embedder 124 may then train a general embedding using the visual-semantic loss (e.g., difference) values between the image embedding and text embedding for the characteristic terms of each corresponding item. This helps ensure that semantically similar items are projected in a nearby embedding space. The general embedding may therefore be a third set of vectors that results from this training that is output from the fully connected layer 464 into a projection actuator 455. The full connected layer 464 may train a general visual semantic embedding model over time with respect to many different fashion items.

In various embodiments, the visual semantic embedder 124 retrieves a type 456 with which to choose a type-specific projection 458, which is to act on the third set of vectors of the FC layer 464 to generate individual type-specific embeddings. The type 456 may be determined from text associated with each of the images 410A, 410B, and 410C retrieved from the online site(s). This may be, for example, a label within metadata, a header, a tag, the image itself, or the like that specifies a "type" of the item corresponding to each respective image. In the current example, the type may be a top, a pants, and a skirt, respectively corresponding to the images 410A, 410B, and 410C.

In related embodiments, the projection actuator 455 may force each vector of the third set of vectors (from the full connected layer 464) to be projected onto one of multiple type-specific embedding spaces, each of which is a subspace of the general embedding space for the lexicon of characteristic terms. For example, each type-specific embedding space, e.g., Embed_1A, Embed_1B, Embed_1C, may be created from a combination of two of the types 456 retrieved from the online site(s). The number of type-specific embedding spaces are created until covering all possible combinations of types. In the present example, the first type-specific embedding space (Embed_1A) may be top-pants space, the second type-specific embedding space (Embed_1B) may be a top-skirt space, and a third type-specific embedding space (Embed_1C) may be a pants-skirt space. The outputs from each of the type-specific embedding spaces are the type-specific embeddings within the type-specific embedding space and may be referred to as a fourth set of vectors.

In this way, the visual semantic embedder 124 may use a learned set of projections that maps the general embedding (third set of vectors from the fully connected layer 464, one for each input item) to type-specific embedding spaces (e.g., Embed_1A, Embed_1B, and Embed_1C) in order to score compatibility between item types. These learned projections may be, for example, projecting a first general embedding (e.g., vector for the top) into top-pants space to generate a first type-specific embedding, projecting a second general embedding (e.g., vector for the pants) into top-pants space to generate a second type-specific embedding, projecting a third general embedding (e.g., vector for the skirt) into pants-skirt space to generate a third type-specific embedding, projecting the vector for the pants into pants-skirt space to generate a fourth type-specific embedding, projecting the vector for the top into top-skirt space to generate a fifth type-specific embedding, and projecting the vector for the skirt into top-skirt space to generate a sixth type-specific embedding.

TABLE A

| Projections/Space | Top-Pants | Top-Skirt | Pants-Skirt |
|---|---|---|---|
| Top | 0.92 | 0.64 | — |
| Pants | 0.87 | — | 0.20 |
| Skirt | — | 0.76 | 0.45 |

These permutations of learning projections may facilitate generation of type-specific embeddings using the three type-specific embedding spaces (e.g., sub-spaces of the general embedding space) to determine which pairs of items are closest to each other. As a summary and by way of example, Table A illustrates prediction values of projections for a certain characteristic term (e.g., could be color) between the six different visual specific embeddings. Note that the prediction value of the top within top-pants space (Embed_A) is close to the prediction value of the pants in top-pants space, and thus the top and pants would be considered compatible to each other. Further, the prediction value of the top in top-skirt space, while lower than in top-pants space, is still relatively close to the prediction value of the skirt in top-skirt space. Thus, the top and the skirt may still be considered sufficiently compatible to be worn together. Finally, note that the prediction value for the pants in pants-skirt space is low and not very close to the prediction value for the skirt in pants-skirt space. Thus, the pants and the skirt may be considered incompatible.

In some embodiments, the visual semantic embedder 124 may include a first comparator 465A and a second comparator 465B (and additional comparators as necessary) with which to cross-compare the differences in prediction values of the specific visual embeddings, e.g., output from the specific embedding spaces as a fourth set of vectors. In a general sense, a small difference means that the two type-specific embeddings are close and a large difference means that the two type-specific embeddings are far apart. Closeness of prediction values may be established as within a percentage threshold of each other, or within a set range, or the like.

In various embodiments, the visual semantic embedder 124 may further include a second fully connected layer 474 that employs a generalized distance metric 468 with which to train a type-specific embeddings model to quantify the distance (e.g., closeness or separateness) of the items based on these differences in the prediction values across the different specific embedding spaces (Embed_1A, Embed_1B, and Embed_1C). The learning may occur over iterations of items based on the characteristic terms in the text lexicon as applied to different items. The full connected layer 474 may output difference vectors with specific compatibility scores (or values) based on how far apart prediction values are for the characteristic terms between the items on which training is performed.

The visual semantic embedder 124 may further include a triplet loss determiner 480 (or other final output layer) that may determine, based on closeness quantified within the outputs of the fully connected layer 474, whether or not two items are compatible for wear in the same outfit. For example, the triplet loss determiner 480 may determine that the compatibility scores (e.g., the difference values within the output difference vectors) may be within a threshold value, whether individually or as a group, in order to indicate compatibility. The search engine server 120 may return search results indicating the two items are compatible. In response to not being within the threshold value, the search engine server 120 may not include the item within those items returned as being mutually compatible in an outfit. In an alternative embodiment, no threshold value is used, and the highest ranked k fashion items based on compatibility scores are returned with search results.

In additional or alternative embodiments, the triplet loss determiner 480 may require that a certain items, such as the top and the pants, to be closer in compatibility score than other items, such as the skirt and the top, because the priority is placed on wearing the pants with the top within a particular outfit. In another example, the priority is placed on wearing the skirt with the top and thus the triplet loss determiner 480 may require that the top and the skirt to be closer together in compatibility score than the top and the pants in order to consider the skirt and the top compatible. In this way, the triple loss determiner 480 may tune the overall output decision of compatibility between two items.

The additional training using the generalized distance metric 468 may facilitate comparison of sets of triplets, thus generating triplet loss indicative of potential incompatibilities between the items associated with the input images due to modeled distance between visual embeddings. A triplet is a set of images $\{x_i^{(u)}, x_j^{(v)}, x_k^{(v)}\}$ with the following relationship: an anchor image $x_i$ is of some type u, and both $x_j$ and $x_k$ are of a different type v. The pair $(x_i, x_j)$ is compatible, meaning that the two items appear together in an outfit, while $x_k$ is a randomly sampled item of the same type as $x_j$ that has not been seen in an outfit with $x_i$. In the present example, the top (associated with the first image 410A) can be viewed as the anchor image, the pants (associated with the second image 410B) as the compatible item, and a random new pants can be viewed as the randomly sampled item, $x_k$. Three different combinations may then be generated using all three of the input items to generate three different sets of triplet loss. How such triplets are processed will be discussed in more detail.

Accordingly, the visual semantic embedder 124 may utilize a different projection for each pairwise compatibility comparison, unlike prior work, which typically uses a single embedding space for compatibility scoring (see FIG. 11A). For example, if an outfit contains a hat, a blouse, and a shoe, the search engine server 120 may learn projections for hat-blouse, hat-shoe, and blouse-shoe embeddings. The visual semantic embedder 124 may train the embeddings along with the generalized distance metric 468, which the visual semantic embedder 124 may use to compute compatibility scores between items.

In this way, the search engine server 120 may use the type-specific projections to transform the general image embedding into pairwise compatibility spaces, along with a generalized distance metric to compare triplets. The pairwise compatibility spaces may be type-specific embedding spaces between two items of possibly distinct types. In addition to scoring type-dependent compatibility, the search engine server 120 also trains the visual semantic embedder 124 using features of text descriptions accompanying each item, which regularizes the general embedding and the learned compatibility and similarity relationships. A more thorough explanation of this training process, and a discussion of results, are described in detail with reference to FIG. 11A through FIG. 17B.

Figure 4C:
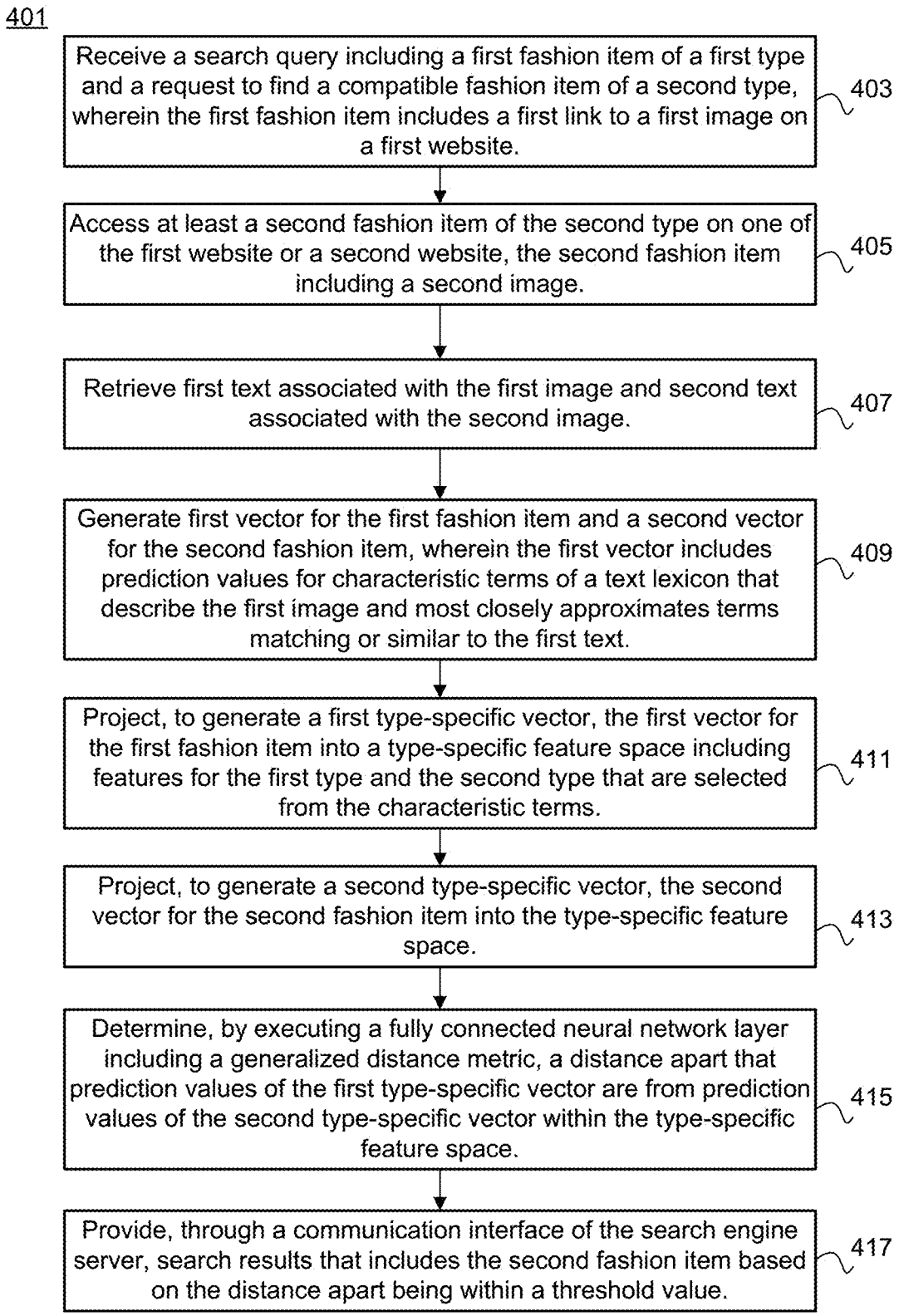

FIGS. 4C-4D are a flow chart of a method 401 for providing search results of a compatible second fashion item based on an input of a first fashion item located on a first website, according to various embodiments. The method 401 may be performed by processing logic that may comprise hardware (e.g., circuitry, dedicated logic, programmable logic, microcode, etc.), software (such as instructions running on the processor), firmware or a combination thereof. In one embodiment, a processor of the search engine server 120 or the processing device of the search engine server 120 performs the method 401. Alternatively, other components of a computing device or cloud server may perform some or all of the operations of the method 401.

With reference to FIG. 4C, at operation 403, the processing logic receives a search query including a first fashion item of a first type and a request to find a compatible fashion item of a second type. The first fashion item includes a first link to a first image on a first website, which in one embodiment, can be the same site as a query submitter.

At operation 405, the processing logic accesses at least a second fashion item of the second type on one of the first website or a second website, the second fashion item including a second image. At operation 407, the processing logic retrieves first text associated with the first image and second text associated with the second image. In one embodiment, the processing logic scrapes the first website to identify first text associated with the first image and one of the first website or the second website to identify second text associated with the second image. In another embodiment, the processing logic receives the first text and the second text with the search query.

At operation 409, the processing logic generates a first vector for the first fashion item and a second vector for the second fashion item. The first vector may include prediction values for characteristic terms of a text lexicon that describe the first image and most closely approximates terms matching or similar to the first text. The second vector may include prediction values for the characteristic terms of the text lexicon that describe the second image and most closely approximates terms matching or similar to the second text.

At operation 411, the processing logic projects, to generate a first type-specific vector, the first vector for the first fashion item into a type-specific feature space having features for the first type and the second type that are selected from the characteristic terms. At operation 413, the processing logic projects, to generate a second type-specific vector, the second vector for the second fashion item into the type-specific feature space.

At operation 415, the processing logic determines, by executing a fully connected neural network layer including a generalized distance metric, a distance apart that prediction values of the first type-specific vector are from prediction values of the second type-specific vector within the type-specific feature space. For example, the distance apart may be distance values between prediction values of the first and second type-specific vectors.

At operation 417, the processing logic provides, e.g., through a communication interface of the search engine server 120, search results that includes the second fashion item based on the distance apart being within a threshold value.

In various embodiments, the method 401 may also include the processing logic retrieving, from the first website, information identifying the first type associated with the first fashion item; retrieving, from one of the first website or the second website, information identifying the second type associated with the second fashion item; and selecting a type-specific projection to direct the processing device to use the first type and the second type in performing the projecting into the type-specific feature space.

In various embodiments, the method 401 may also include the processing logic generating distance values by comparing the prediction values of the first type-specific vector with the prediction values of the second type-specific vector; generating compatibility scores based on the distance values; and determining, based on the compatibility scores, that the distance apart is within the threshold value.

In various embodiments, the method 401 may also include the processing logic requiring that the threshold value be smaller as between the first fashion item and the second fashion item than as between the first fashion item and a third fashion item of a third type.

In some embodiments, the method 410 may continue with FIG. 4C for performing the operation 409 of FIG. 4B. For example, at operation 419, the processing logic executes an image embedder to generate a first pair of vectors including prediction values for the characteristic terms that describes the first image and the second image, respectively. At operation 421, the processing logic executes a text embedder to generate a second pair of vectors including prediction values for the characteristic terms based on match or similarity to the first text and the second text, respectively.

At operation 423, the processing logic executes a first fully connected neural network layer including a visual semantic loss algorithm to combine the first pair of vectors with the second pair of vectors into a third pair of vectors that most closely approximates prediction values of the second set of vectors. The third pair of vectors include the first vector for the first fashion item and the second vector for the second fashion item that were generated at operation 409 of FIG. 4B.

Figure 5:
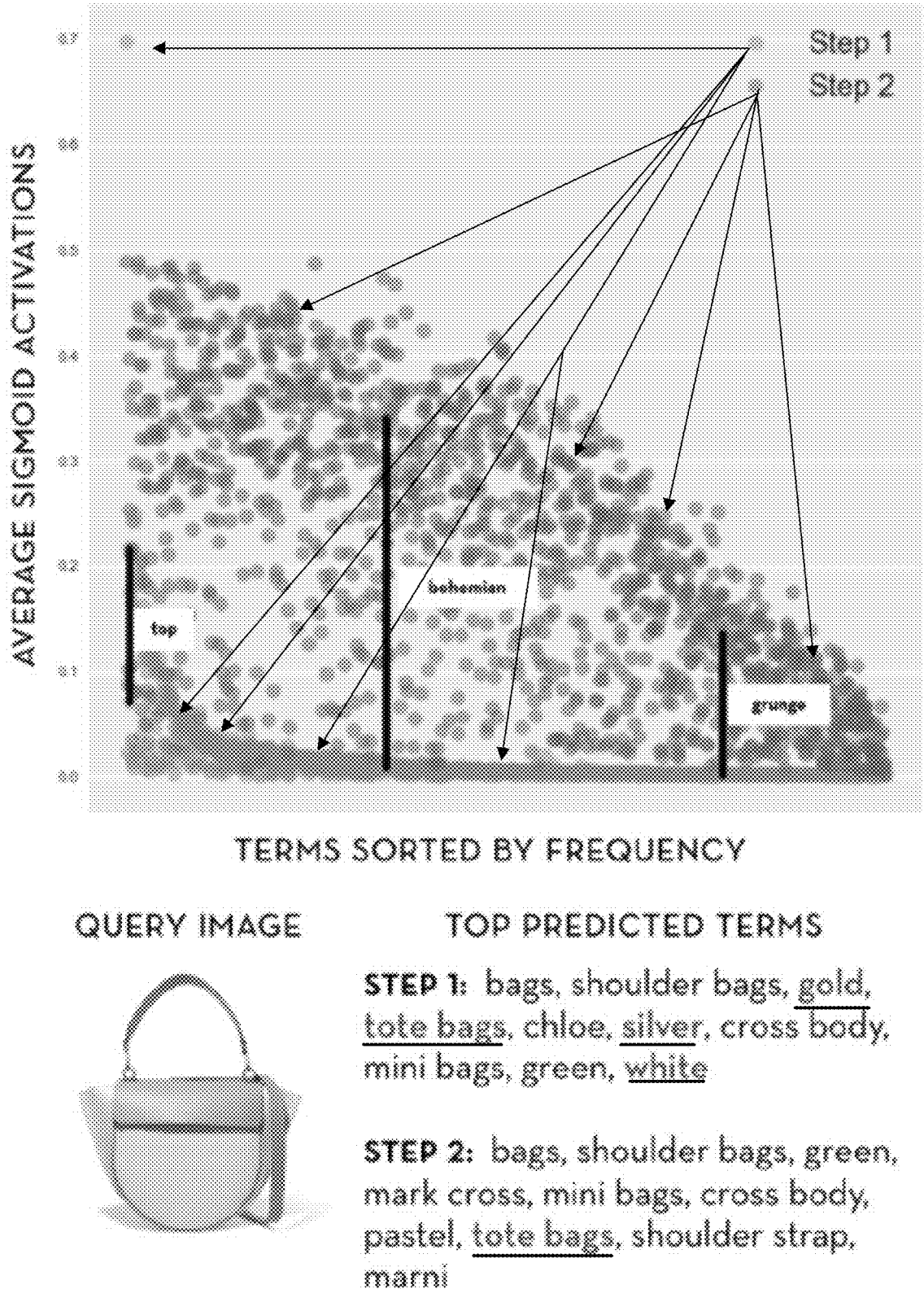
FIG. 5 is a plot graph illustrating the average sigmoid activations from the trained NN regressor model of FIG. 4A, which provide predictions of the NN regressor model for the true positives per term within the terms in the lexicon sorted by frequency, according to an embodiment.
Figure 6B:

FIG. 5 is a plot graph illustrating the average sigmoid activations from the trained NN regressor model of FIG. 4A, which provide predictions of the NN regressor for the true positives per term within the terms in the lexicon sorted by frequency, according to an embodiment. Each black bar shows the difference between step one and step two for a particular term. The example in FIG. 5 illustrates a green shoulder bag, and the ten most relevant terms output by the trained NN regressor model in step one and step two, respectively. The inappropriate terms are underlined.

To evaluate the NN regressor model on the task of learning the appropriate text context, the search engine server 120 measures its performance on product retrieval through top k precision. This metric accurately represents the performance in real-world use-cases where a user searches for a particular product with a query term and expects the top results to be related to the term.

To compute the top k precision for a term v, the search engine server 120 computes, for each product in the test set, the sigmoid activations from the last layers of the NN regressor model for the term v. The search engine server 120 then selects the top k products with the highest activations. The search engine server 120 may then calculate precision "text accuracy" as the fraction of the top k items that have the query term in their text description. The search engine server 120 also reports the "visual accuracy," which is the fraction of the top k products that match the query item on visual inspection as reported by experts.

While top k precision accurately models potential real-world use cases for the NN regressor model, it heavily depends on correct, complete, and exhaustive labels for the data. However, coming up with such exhaustive labeling for fashion products is difficult and expensive, given that such labels are often subjective and require imagination on the part of the labeler. This is also aptly represented in our crawled dataset from Net-A-Porter where all of the metadata combined still provides only a subset of the "true" labels. Therefore, the inventors chose to report both text and visual accuracy for 48 terms, consisting of six randomly selected terms from the 25 most-popular terms in each of the eight different categories in the developed lexicon. To report the visual accuracy, the inventors conducted a small study where we recruited two fashion experts to look at the top 10 products for each term and classify each product as either matching or not matching the queried term. For terms like brand, we asked the experts to label based on the existence of the perceived style of the queried brand. In some sense the visual accuracy is a good proxy for the "true" performance of the NN regressor model over an exhaustive set of "true" labels.

With further reference to the graph plot of FIG. 5, the average sigmoid activations for the true positives per term are sorted by frequency. The plot is of the averaged sigmoid activations for the true positives for the 1,300 terms in the lexicon sorted by their frequency. Note that the distribution of activation values for step two are significantly more spread out and higher than those obtained from step one. The spread of these values is more accentuated for words that do not have high frequencies. We believe that training separate neurons and the balanced resampling procedure followed while training the individual neurons ensures that they fire for the term regardless of its relative frequency. In contrast, activations for each term in step one are a lot more biased to the frequencies of the other terms, and this results in the model being more biased towards words with higher frequencies.

With additional reference to FIG. 5, the "Top Predicted Terms" section shows a qualitative example where the search engine server 120 outputs the top 10 most relevant words for the item. It should again be noted that even though the item is not white, or silver, step one's heavy bias towards high frequency terms leads it have a higher score for such terms than more appropriate terms such as green.

FIGS. 6A, 6B, 6C, 6D are a series of graphs to illustrate the top 10 product items for the six selected terms from each of eight categories, accompanied by visual and text accuracies, according to various embodiments. Text accuracy is based on the labels extracted from the product metadata, while visual accuracy is based on human annotations. From the depicted results of FIGS. 6A, 6B, 6C, and 6D, observe that the visual accuracy is as good as or better than the text accuracy for 44 out of the 48 terms. For example, the text accuracy predictor for "taupe" in the color category is only 20% (0.20). This means that the words returned with the image from the system (pictured in the middle) only 20% actually had the word taupe. The 85% number (0.85) resulted upon showing the picture to human evaluators, which used the word "taupe" 85% of the time.

Looking under the brands section, one can note that the text accuracy is especially low since the NN regressor model does not actually retrieve products made by the brand. However, the model may actually capture the styles of the brands accurately; for example, Burberry results in jackets that are all trench-coat style, double-breasted, and belted, while Gucci results in clothing items that are rich in red. These are mostly items that could be labeled as capturing the style of these brands and thus have high visual accuracies. A similar case can be made for uncommon colors like burgundy or black where the text accuracies are misleading since the high visual accuracy suggests that the NN regressor model actually labeled the item better than its existing set of text labels.

By way of extension, this item labeling procedure may also employ the NN regressor model to identify an image that has been mislabel or inaccurately labeled by human labelers. There are many people spending lots of time labeling such images, and they often get it wrong or leave out identifiers. The search engine server 120 may employ the NN regressor model to ensure proper identification where human labelers may have been incorrect, or at best, inaccurate.

TABLE 1

|  | VISUAL ACCURACY | | TEXT ACCURACY | |
| --- | --- | --- | --- | --- |
|  | μ | σ | μ | σ |
| style | 0.95 | 0.03 | 0.48 | 0.26 |
| trim | 0.93 | 0.03 | 0.32 | 0.13 |
| material | 0.96 | 0.04 | 0.77 | 0.19 |
| type | 0.95 | 0.03 | 0.95 | 0.08 |
| brand | 0.79 | 0.04 | 0.45 | 0.25 |
| shape | 0.93 | 0.04 | 0.80 | 0.15 |
| color | 0.86 | 0.04 | 0.55 | 0.31 |
| pattern | 0.87 | 0.09 | 0.57 | 0.33 |
| total | 0.90 | 0.02 | 0.61 | 0.29 |

Table 1 illustrates the average text and visual accuracies for the six terms in each of the eight categories in FIGS. 6A through 6D, where the symbol μ stands for mean and the symbol σ stands for standard deviation. While for most terms the difference between the text and visual accuracies is large, it should be noted that the difference between the mean accuracies is lowest (near zero) for 'type' terms and highest for 'brand' and 'style' terms. This again verifies our hypothesis that assigned labels for more subjective words like style and brand are more likely to be incomplete and noisy as compared to those for 'type.'

State-of-the art search engines on leading fashion e-commerce websites rely on some form of keyword matching to support product retrieval. However, such keyword matching approaches rely heavily on the completeness of the product metadata and often fail at capturing the semantics of the textual information due to noisy labeling. Such methods also fail to take into account the visual information embedded in the images. Learning a mapping of visual features to a semantic fashion lexicon not only allows the disclosed NN regressor model to be fairly robust to noisy labels, but also helps enable better multimodal queries.

Using the neural regressor, the search engine server 120 may compute activations for all 1300 neurons for product images. Each activation may represent an "association score" of that term and the item. Users then query the NN regressor model for style and context with arbitrary combinations of these 1300 characteristics. Those queries may be submitted in a variety of different query types.

Text-based queries: To compute how strongly a term, (i), is associated with a product, the search engine server 120 computes the visual semantic embedding of the product and then computes the "association score" for that term using the activation of the $i^{th}$ neuron. To retrieve a set of (k) items that best match a term of the query, the search engine server 120 samples a subset of fashion items, and returns the top k items with the largest "association score" for the term. If the query contains a set of terms, the search engine server 120 computes the combined association score as the product of the association scores of individual terms, so products with a very low association scores for any term in the set get penalized heavily.

Text-based explanations: When recommending fashion items, professional stylists usually accompany their suggested items with explanations. Being able to explain the results of a query helps users understand the reasoning behind them. It also increases their confidence in the results. For example, when a user searches for evening gowns, she might wonder what elements make the items exhibit an evening style. The search engine server 120 leverages the different categories in the developed lexicon of 1300 words to provide explanations for style-level characteristics, using element-level terms in the lexicon as shown in FIG. 7.

To show and explain results for a text query with style or outfit level terms, the search engine server 120 first computes the top k most "associated" items for the query using the procedure described above. The search engine server 120 may then compute the average activation score for each term in the lexicon for these k products. The top element-level terms with the highest average activation scores serve as explanations for our results, e.g., may be formatted into phrases and sentences that explain the relevance of the image-based search results supplied in response to the query. Such explanations also allow us to better understand outfit or even brand-level styles. For example, one can learn about the style and element terms that describe a brand by feeding a brand as input into the multi-level neural network (FIG. 4A) and constraining the output categories to style, color, material, shape, trim, and pattern.

Application: Get-the-Same-Look-for-Less: Brands defined by their own design language at some level represent a certain style. Those seeking the style offered by luxury brands such as Burberry or Jimmy Choo may be held back by their costly pricing. However, there are often other brands that offer products with similar visual styles at more affordable costs. In fact, this is a concept discussed in many articles in the fashion community. As the search engine server 120 characterizes brands with their stylistic traits, the search engine server 120 allows users to query for the products that look similar to a particular brand and that falls into an acceptable price range. For example, a user can look for a Burberry-style coat that is less than $1,000, and the search engine server 120 identifies a set of double-breasted trench coats from less expensive brands (see FIG. 8). This is because the machine-learned NN regressor model knows what a certain style/brand looks like, so can then do a comparison to other similarly-styled clothes, but which are listed for a certain amount less, such as 30%, 50%, or some other threshold percentage less than the price on the queried item.

To demonstrate this query, the search engine server 120 mined the price for all the product items in our testing set. Users query with a brand and a price range, while the search engine server 120 uses brand name to get the top k (e.g., top number of) most associated items and then filter out some of those items that do not fit the given price range. In FIG. 8, the first and third rows show the items from the original brand, while the second and fourth rows show more affordable items that look similar. As illustrated, the disclosed NN regressor model also returns explanations (bolded terms in FIG. 8) for what characterizes the style of the brand for which the look-alikes are being returned in search results.

Style and Context Based Compatibility: Recent work captures the notion of compatibility by embedding all the items into a single space and minimizing the distance between compatible items. Other work solved the problem by projecting the item into many embedding spaces each that measures a distinct notion of relatedness. Recently, the inventors proposed a model that respect the types of fashion items and prevent what is termed in the art as "naughty transitivity," which will be discussed in more detail. Naughty transitivity is the often wrong assumption that because item A (like a hat) is found to be compatible with item B (like a pair of pants) and item C (like a pair of shoes) also goes with item B, that item A necessarily also goes with item C. In this example, the hat and shoes are often incompatible and should be compared directly to each other within the context of the overall outfit.

Machine learning researchers attempted to quantitatively measure the notion of compatibility between clothing items. Recent works capture compatibility by embedding all the items into a single space and minimizing the distance between compatible items. However, as per the above example, compatibility is not transitive. Thus, using a single space to measure clothing compatibility creates the following 'improper triangles'—an item which is compatible with two other distinct items leads to the three items becoming mutually compatible. The inventors propose solving the naughty transitivity problem by having separate spaces that capture the compatibility between each pair of different types to prevent the naughty transitivity, which will be discussed in more detail. With the vision embedding alone, the search engine server 120 can answer image-based compatibility queries: given the image of a query item along with a type, the search engine server 120 may identify other products of a different type that is compatible with the query item.

Compatibility Query: To determine whether two fashion items are compatible, a user supplies the front image of the two items $i_1$, $i_2$ and the type for both items $t_1$, $t_2$. The NN regressor model may compute the vector representation for both images in the compatibility spaces for all the possible pairing of types the model supports. Knowing the associated types $t_1$, $t_2$, the search engine server 120 locates the embedding space corresponding to the compatibility between the type pair, retrieves the compatibility vector $c_1$, $c_2$ for both query items (e.g., output from the respective embedding space such as Embed_1A, Embed_1B, and the like in FIG. 4B), and outputs the Euclidean distance between the two vectors $d=|c_1-c_2|$ as the compatibility score. The smaller that d is, the more compatible are $i_1$ and $i_2$.

To retrieve a set of k items (e.g., where k is a predetermined number of items) of type t that are compatible with a query item $i_q$, the search engine server 120 samples a collection of fashion items I of type t and computes the compatibility distance $d_i$ between each sampled item $i \in I$ and the query item $i_q$ in the corresponding type-aware compatibility space. The search engine server 120 may further sort all the distances and return the k items with the smallest $d_i$ as the k most-compatible items. In the case when a user supplies a set of query item(s) $I_q$, the search engine server 120 computes the distance $d_i$, which represent how compatible a sampled item $i \in I$ is with the query item(s) $I_q$ as $$d_i = \frac{\sum_{q \in I_q} d_{iq}}{|I_q|}.$$

With the ability to query with nuanced fashion characteristics, users might as well look for fashion products that match with some items they have in mind, while also exhibiting certain styles. In fact, an often-discussed topic during styling sessions is that users describe some item(s) they own and ask for other items that match with it under some specific circumstance. People concerned about this problem can usually determine (e.g., recognize) if a set of clothing is suitable for the given scenario, but have difficulties generating them. With the disclosed search engine server 120, users can make context-based compatibility query so the result items both match with the query items and the context.

Context-Based Compatibility Query: Suppose a user queries the search engine server 120 with a set of items $I_q$, a target type t, and a set of textual terms W⊆L. The search engine server 120 may sample a collection of fashion items I of type t, determine the combined association value $v_i$ as stated in "Fashion Terms Query," and the compatibility distance $d_i$ as stated in the "Compatibility Query." The search engine server 120 may further compute the context-based compatibility score as $$u_i = \frac{v_i}{d_i + \varepsilon},$$

rank the $u_i$ for all items I, and respond to the query with the items with the largest $u_i$.

In other cases, users look for generating an entire outfit for a specific occasion such as a summer beach wedding. They could be simply looking for inspirational pictures or actually need to dress themselves up using clothes from their wardrobes. The previous use case usually takes many iterations and the other one requires a good comprehension of the items available in the person's wardrobe, both demanding for a human stylist. However, using the search engine server 120, a user can, for example, receive a recommendation for a sporty outfit based on a plaid skirt that the user has in mind, as illustrated in FIG. 9.

FIG. 9 is an example search results page containing outfit completion in response to style-based and context-based outfit queries, according to various embodiments. Note that the multi-modal input in the search engine server 120 (such as a bag and the word "weekend") is the input query, and the search engine server 120 returns a multi-modal output as the search results, e.g., a bottom, a cropped top, a pair of boots, and a belt. Included with the multi-modal output is a structured text explanation of not only why these items go together, but also why they are related to the input term "weekend." The combination of the images representing the recommended fashion items and the structure text explanation provides contextual compatibility for the outfit within the context it is to be worn. For example, "Paired with leather accessories, this weekend look is incomplete without a cropped blouse and distressed skinny jeans." FIG. 9 illustrates additional examples such as pairing the bag with "party," submitting only a skirt, submitting a skirt with the image of the blouse, and so forth, with different related multi-modal search results.

Style and Context-Based Outfit Generation: The search engine server 120 may enable the automatic outfit generation from a pool of fashion items I and with one or more characteristics defined by a set of fashion lexicon W⊆L from the disclosed fashion lexicon. The search engine server 120 may first obtain a set of top items $I_k$ associated with the context through "Fashion Terms Query" and randomly sample the first item of the outfit from $I_k$. Then, the search engine server 120 may iterate the NN regressor model over every type t that is missing from the outfit. The search engine server 120 may call "Context-Based Compatibility Query" (e.g., a piece of software code) with the item in the outfit as the query item set $I_q$, t as the target type, and the W as the set of terms that describe the context. The search engine server 120 may then randomly select an item from the top results and add the item to the outfit. The search engine server 120 may continue iterating with the next missing type t and update the outfit until the outfit contains an item of every type.

Application: Generating Capsule Wardrobes: The concept of capsule wardrobe originated between the 1970s and 1980s. It was defined as a compact wardrobe made up of staple pieces in coordinating colors, usually in the realm of 30 items or fewer, including shoes and sometimes accessories. The idea is to have a small set of interchangeable items that can be worn frequently, to be cost-efficient and simplify the problem of picking clothes. One work designed an algorithm for creating capsule wardrobes from product images, but the work does not allow users to specify the style and context. The search engine server 120 is able to generate a capsule wardrobe that matches a user-defined context from a pool of available items submitted as a query. One can provide a highly customize need, such as going on a tropical getaway during summer (see FIG. 10). The search engine server 120 generates a collection of suitable clothes for packing while also showcasing some of the constructible outfits and describe how the styles of the outfits go along with the chosen theme.

FIG. 10 is an example search results page to provide a capsule wardrobe recommendation, according to various embodiments. FIG. 10 demonstrates the interaction of automatically creating a capsule wardrobe for a particular season or a vacation, specified by the user through a Web browser. The search engine server 120 may return outfits as search results and provide explanations for how those outfits work within the chosen scenarios. For example, "For a tropical summer vacation, pack playful, vibrant prints, and choose pieces like orange purses to add a playful pop of color."

Generating capsule wardrobe: Given a pool of items I, a selected topic word w, and a size dictionary for the capsule, which specifies how many items to generate per type, the search engine server 120 may call a "Style and Context-Based Outfit Generation" algorithm to generate a complete outfit with the context w as the initial set of items in the capsule L. Then, the search engine server 120 may iterate over each type in the size dictionary, and then call the "Context-Based Compatibility Query" module with $I_c$ as the query items, w as the context, and the current type as t, to get an item that matches with all the existing items in the capsule. The search engine server 120 may randomly select an item from the top results, add the item to the capsule, and proceed to the next type that is not yet full. The iteration stops when the capsule is the size of the size dictionary. This method ensures that all the items in the capsule are approximately compatible with each other.

Visual Semantic Embedding

Outfits in online fashion data are composed of items of many different types (e.g. top, bottom, shoes) that share some stylistic relationship with one another. A representation for building outfits requires a method that can learn both item-based similarity (for example, when two tops are interchangeable) and compatibility (items of possibly different type that can go together in an outfit). The below discussion presents an approach to learning an image embedding that respects item type, and jointly learns notions of item similarity and compatibility in an end-to-end model.

To evaluate the learned representation, the search engine server 120 crawled 68,306 outfits created by users on the Polyvore website. The disclosed approach obtains 3-5% improvement over the state-of-the-art on outfit compatibility prediction and fill-in-the-blank tasks using the resultant dataset, as well as an established smaller dataset, while supporting a variety of useful queries.

Outfit composition is a difficult problem to tackle due to the complex interplay of human creativity, style expertise, and self-expression involved in the process of transforming a collection of seemingly disjoint items into a cohesive concept or combination of characteristics. Beyond selecting which pair of jeans to wear on any given day, humans battle fashion-related problems ranging from, "How can I achieve the same look as celebrity X on a vastly inferior budget?," to "How much would this scarf con-tribute to the versatility of my personal wardrobe?," to "How should I dress to communicate motivation and competence at a job interview?" The search engine server 120, as described herein, is able to respond to such diverse and logical queries.

To learn how to compose outfits, the underlying representation is to support both item-based similarity (e.g., when two tops are interchangeable) and notions of compatibility (items of possibly different type that can go together in an outfit). Current research handles both kinds of relationships with an embedding strategy: one trains a mapping, typically implemented as a convolutional neural network, which takes input items to an embedding space. The training process tries to ensure that similar items are embedded nearby (e.g., are similarly categorized), and items that are different have widely separated embeddings, e.g., as illustrated in FIG. 11A. Objects that are compatible lie close; as a result, all shoes that match a given top are positioned close to each other.

These strategies, however, do not respect types (e.g. shoes embed into the same space hats do), which has important consequences. Failure to respect types when training an embedding compresses variation: for instance, all shoes matching a particular hat are forced to embed close to one another, thus making them appear compatible even if they are not, which severely limits the model's ability to address diverse queries. Worse, this strategy encourages improper transitive relationships. For example, if a pair of shoes match a hat, and that hat in turn matches a blouse, then a natural consequence of models without type-respecting embeddings is that the shoes are forced to also match the blouse. This is because the shoes must embed close to the hat to match, the hat must embed close to the shoes to match, thus ensuring the shoes embed close to the blouse as well. Instead, these items should be allowed to match in one context, and not match in another. An alternative way to describe the issue is that compatibility is not naturally a transitive property, but being nearby in image embeddings is naturally a transitive property. Thus, an embedding that clusters items close together is not a natural way to measure compatibility without paying attention to context. By learning type-respecting spaces to measure compatibility, as in FIG. 11B, the search engine server 120 avoids the issues stemming from using a single embedding.

FIG. 11B is a set of charts to illustrate type-respecting embeddings, using "top," "bottom," and "shoes" as examples, according to an embodiment. The search engine server 120 may first first learn a single, shared embedding space. Then, the search engine server 120 may project from that shared embedding to subspaces identified by type. This means that all shoes that match a given top must be close in shoe-top space, but can be very different in the general embedding space. This enables us to search for two pairs of shoes that 1) match the same top, and 2) look very different from one another.

In various embodiments and with additional reference to FIG. 4B, the search engine server 120 begins by encoding each image in a general embedding space, which it uses to measure item similarity. The search engine server 120 (e.g., the visual semantic embedder 124) may then train a general embedding using a visual-semantic loss between the image embedding and features representing a text description of the corresponding item. This helps ensure that semantically similar items are projected in a nearby space. In addition, the search engine server 120 may use a learned projection, which maps a general embedding to a secondary embedding space that scores compatibility between two item types. The visual semantic embedder 124 may utilize a different projection for each pairwise compatibility comparison, unlike prior work, which typically uses a single embedding space for compatibility scoring (FIG. 11B). For example, if an outfit contains a hat, a blouse, and a shoe, search engine server 120 would learn projections for hat-blouse, hat-shoe, and blouse-shoe embeddings. The embeddings are trained along with a generalized distance metric, which search engine server 120 may use to compute compatibility scores between items.

Since many of the current fashion datasets either do not contain outfit compatibility annotations, or are limited in size and the type of annotations they provide, the search engine server 120 may collect its own dataset, described below. Later on, we discuss our type-aware embedding model, which enables us to perform complex queries on our data. Our experiments outlined in a further section demonstrate the effectiveness of our approach, reporting a 4% improvement in a fill-in-the-blank outfit completion experiment, and a 5% improvement in an outfit-compatibility-prediction task over the prior state-of-the-art.

Polyvore Dataset: The Polyvore fashion website enables users to create outfits as compositions of clothing items, each containing rich multi-modal information such as product images, text descriptions, associated tags, popularity score, and type information. One work supplied a dataset of Polyvore outfits (referred to as the Maryland Polyvore dataset). See Han, X., Wu, Z., Jiang, Y. G., Davis, L. S., Learning fashion compatibility with bidirectional LSTMs, ACM MM (2017) (hereinafter Han et al.). This dataset is relatively small, does not contain item types or detailed text descriptions (see Table 2), and has some inconsistencies in the test set that make quantitative evaluation unreliable (additional details below). To resolve these issues, we collected our own dataset from Polyvore annotated with outfit and item ID, fine-grained item type, title, text descriptions, and outfit images. Outfits containing a single item or are missing type information are discarded, resulting in a total of 68,306 outfits and 365,054 items. Statistics comparing the two datasets are provided in Table 2.

Test-train splits: Splits for outfit data are quite delicate, as one must consider whether a garment in the training set should be allowed to appear in unseen test outfits, or not at all. As some garments are "friendly" and appear in many outfits, this choice has a significant effect on the dataset. We provide two different versions of our dataset with respective train and test splits. An "easier" split contains 53,306 outfits for training, 10,000 for testing, and 5,000 for validation, whereby no outfit appearing in one of the three sets is seen in the other two, but it is possible that an item participating in a training outfit is also encountered in a test outfit. A more "difficult" split is also provided whereby a graph segmentation algorithm was used to ensure that no garment appears in more than one split. Each item is a node in the graph, and an edge connects two nodes if the corresponding items appear together in an outfit. This procedure requires discarding "friendly" garments, or else the number of outfits collapses due to super-connectivity of the underlying graph. By discarding the smallest number of nodes necessary, the search engine server 120 ends up with a total of 32,140 outfits and 175,485 items, 16,995 of which are used for training and 15,145 for testing and validation.

Table 2 is a comparison in dataset statistics. Our dataset's variants (last two rows) contain more outfits than related datasets along with detailed descriptions and fine-grained semantic categories.

TABLE 2

| Dataset | #Outfits | #Items | Max Items/ Outfit | Text Available? | Semantic Category? |
|---|---|---|---|---|---|
| Maryland Polyvore | 21,889 | 164,379 | 8 | Titles Only Titles & Descriptions | — |
| Polyvore Outfits | 32,140 | 175,485 | 16 | Titles & Descriptions | ✓ |
| Polyvore Outfits-D | 68,306 | 365,054 | 19 | | ✓ |

In various embodiments, for the $i^{th}$ data item $x_i$, an embedding method uses some regression procedure (currently, a multilayer convolutional neural network) to compute a nonlinear feature embedding $y_i = f(x_i; \theta) \in \mathbb{R}^d$. The goal is to learn the parameters $\theta$ of the mapping f such that for a pair of items $(x_i, x_j)$, the Euclidean distance between the embedding vectors $y_i$ and $y_j$ reflects their compatibility. We would like to achieve a "well-behaved" embedding space in which that distance is small for items that are labeled as compatible, and large for incompatible pairs.

Assume we have a taxonomy of T types, and let us denote the type of an item as a superscript, such that $x_i^{(\tau)}$ represents the i'th item of type $\tau$, where $\tau = 1, \ldots, T$. A triplet is defined as a set of images $\{x_i^{(u)}, (x_j^{(v)}, x_k^{(v)})\}$ with the following relationship: the anchor image $x_i$ is of some type u, and both $x_j$ and $x_k$ are of a different type v. The pair $(x_i, x_j)$ is compatible, meaning that the two items appear together in an outfit, while $x_k$ is a randomly sampled item of the same type as $x_j$ that has not been seen in an outfit with $x_i$. Let us write the standard triplet loss in the general form $$\ell(i, j, k) = \max\{0, d(i, j) - d(i, k) + \mu\} \quad (1)$$

where $\mu$ is some margin.

We will denote by $\mathcal{M}^{(u,v)}$ the type-specific embedding space in which objects of types u and v are matched. Associated with this space is a projection $\mathcal{P}^{u \to (u,v)}$, which maps the embedding of an object of type u to $\mathcal{M}^{(u,v)}$. Then, for a pair of data items $(x_i^{(u)}, x_j^{(v)})$ that are compatible, we require the distance $\|\mathcal{P}^{u \to (u,v)}(f(x_i^{(u)}; \theta)) - \mathcal{P}^{v \to (u,v)}(f(x_j^{(v)}; \theta)\|$ to be small. This does not mean that the embedding vectors $f(x_i^{(u)}; \theta)$ and $f(x_j^{(v)}; \theta)$ for the two items in the general embedding space are similar: the differences just have to lie close to the kernel of $\mathcal{P}^{u \to (u,v)}$.

This general form requires the learning of two (d×d) matrices per pair of types for a d-dimensional general embedding. Herein, we investigate two simplified versions: (a) assuming diagonal projection matrices such that $\mathcal{P}^{u \to (u,v)} = \mathcal{P}^{v \to (u,v)} = \text{diag}(w^{(u,v)})$, where $w^{(u,v)} \in \mathbb{R}^d$ is a vector of learned weights, and (b) the same case, but with $w^{(u,v)}$ being a fixed binary vector chosen in advance for each pairwise type-specific space, and acting as a gating function that selects the relevant dimensions of the embedding most responsible for determining compatibility. Compatibility is then measured with $$d_{ij}^{uv} = d(x_i^{(u)}, x_j^{(v)}, w^{(u,v)}) = \|f(x_i^{(u)}; \theta) \odot w^{(u,v)} - f(x_j^{(v)}; \theta) \odot w^{(u,v)}\|_2^2, \quad (2)$$

where $\odot$ denotes component-wise multiplication, and learned with the modified triplet loss:

$$\mathcal{L}_{comp}(x_i^{(u)}, x_j^{(v)}, x_k^{(v)}, w^{(u,v)}; \theta) = \max\{0, d_{ij}^{uv} - d_{ik}^{uv} + \mu\}, \quad (3)$$

where $\mu$ is some margin.

To regularize the learned item-based compatibility, we further make use of the text descriptions accompanying each item image and feed them as input to a text embedding network. Let the embedding vector outputted by that network for the description $t_i^{(u)}$ of image $x_i^{(u)}$ be denoted $(t_i^{(u)}; \phi)$, and substitute g for f in $\ell$ as required; the loss used to learn similarity is then given by $$\mathcal{L}_{sim} = \lambda_1 \ell(x_j^{(v)}, x_k^{(v)}, x_i^{(u)}) + \lambda_2 \ell(t_j^{(v)}, t_k^{(v)}, t_i^{(u)}), \quad (4)$$

where $\lambda_{1-2}$ are scalar parameters.

The search engine server 120 may also train a visual-semantic embedding in the style of Han et al. by requiring that image $x_i^{(u)}$ is embedded closer to its description $t_i^{(u)}$ in visual-semantic space than the descriptions of the other two images in a triplet:

$$\mathcal{L}_{sei} = \ell(x_i^{(u)}, t_i^{(u)}, t_j^{(v)}) + \ell(x_i^{(u)}, t_i^{(u)}, t_k^{(v)}) \quad (5)$$

and imposing analogical constraints on $x_j^{(v)}$ and $x_k^{(v)}$.

To encourage sparsity in the learned weights w so to achieve better disentanglement of the embedding dimensions contributing to pairwise type compatibility, we add an $\ell_1$ penalty on the projection matrices $\mathcal{P} \to (\cdot, \cdot)$. We further use $\ell_2$ regularization on the learned image embedding (x; θ). The final training loss therefore becomes:

$$\mathcal{L}_{(X, T, \mathcal{P} \to (\cdot,\cdot), \lambda, \theta, \phi)} = \mathcal{L}_{comp} + \mathcal{L}_{sim} + \lambda_3 \mathcal{L}_{vse} + \lambda_4 \mathcal{L}_{l_2} + \lambda_5 \mathcal{L}_{l_1} \quad (6)$$

where X and T denote the image embeddings and corresponding text embeddings in a batch, $\mathcal{L}_{vse} = \mathcal{L}_{vse_i} + \mathcal{L}_{vse_j} + \mathcal{L}_{vse_k}$, and $\lambda_{3-5}$ are scalar parameters. We preserve the dependence on $\mathcal{P} \to (\cdot,\cdot)$ in notation to emphasize the type dependence of our embedding. As below discussion illustrates, this term has significant effects.

Following the method in Han et al., we evaluate how well the visual semantic embedding approach performs on two tasks. In the "fashion compatibility" task, a candidate outfit is scored as to whether its constitute items are compatible with each other. Performance is evaluated using the average under a receiver operating characteristic curve (AUC). The second task is to select from a set of candidate items (four in this case) in a fill-in-the-blank (FITB) fashion recommendation experiment. The goal is to select the most compatible item with the remainder of the outfit, and performance is evaluated by accuracy on the answered questions.

Datasets. For experiments on the Maryland Polyvore dataset, we use the provided splits, which separate the outfits into 17,316 for training, 3,076 for testing, and 1,407 for validation. For experiments using our Polyvore Outfits dataset, we use the different version splits described above. We shall refer to the "easier" split as Polyvore Outfits, and the split containing only disjoint outfits down to the item level as Polyvore Outfits-D.

Implementation. We use a 18-layer Deep Residual Network 13 which was pretrained on ImageNet 7 for our image embedder with a general embedding size of 64 dimensions unless otherwise noted. Our model is trained with a learning rate of $5e^{-5}$, batch size of 256, and a margin of 0.2. For our text representation, we use the HGLMM Fisher vector coding of word2vec after having been PCA reduced down to 6000 dimensions. We set $\lambda_3=5e^-$ from Equation (6) for the Maryland Polyvore dataset ($\lambda_3=5e^{-5}$ for experiments on our dataset), and all other $\lambda$ parameters from Equation (4) and Equation (6) to $5e^{-4}$.

Sampling Testing Negatives. In the test set provided by Han et al., a negative outfit for the compatibility experiment could end up containing only tops and no other items, and a fill-in-the blank question could have an earring be among the possible answers when trying to select a replacement for a shoe. This is a result of sampling negatives at random without restriction, and many of these negatives could simply be dismissed without considering item compatibility. Thus, to correct this issue and focus on outfits that cannot be filtered out in such a manner, we take into account item category when sampling negatives. In the compatibility experiments, we replace each item in a ground truth outfit by randomly selecting another item of the same category. For the fill-in-the-blank experiments, our incorrect answers are randomly selected items from the same category as the correct answer.

Comparative Evaluation. In addition to performance of the state-of-the-art methods reported in prior work, we compare the following approaches:

a.—SiameseNet (ours). The approach of Veit et al. that uses the same ResNet and general embedding size as used for our type-specific embeddings. See Veit, A., Kovacs, B., Bell, S., McAuley, J., Bala, K., Belongie, S., Learning visual clothing style with heterogeneous dyadic co-occurrences, ICCV (2015).

b.—CSN, T1:1. Learns a pairwise type-dependent transformation using the approach of Veit et al. to project a general embedding to a type-specific space which measures compatibility between two item categories. See Veit, A., Belongie, S., Karaletsos, T., Conditional similarity networks, CVPR (2017).

c.—CSN, T4:1. Same as the previous approach, but where each learned pairwise type-dependent transformation is responsible for four pairwise comparisons

TABLE 3

| Method | All Negatives | | w/Composition Filtering | |
|---|---|---|---|---|
| | FITB Accuracy | Compat. AUC | FITB Accuracy | Compat. AUC |
| (a) SetRNN | 29.6 | 0.53 | — | — |
| SiameseNet | 52.0 | 0.85 | — | — |
| Bi-LSTM (512-D) | 66.7 | 0.89 | — | — |
| Bi-LSTM + VSE (512-D) | 68.6 | 0.90 | 81.5 | 0.78 |
| (b) SiameseNet (ours) | 54.2 | 0.85 | 72.3 | 0.81 |
| CSN, T1:1 | 51.6 | 0.83 | 74.9 | 0.83 |
| CSN, T1:1 + VSE | 52.4 | 0.83 | 73.1 | 0.83 |
| CSN, T1:1 + VSE + Sim | 51.5 | 0.82 | 75.1 | 0.79 |
| CSN, T4:1 + VSE + Sim + Metric | 84.2 | 0.90 | 75.7 | 0.84 |
| CSN, T1:1 + VSE + Sim + Metric | 86.1 | 0.98 | 78.6 | 0.84 |

Table 3 is a comparison of different methods on the Maryland Polyvore dataset using their unrestricted randomly sampled negatives on the fill-in-the-blank and outfit compatibility tasks. "All Negatives" refers to using their entire test split as is, while "Composition Filtering" refers to removing easily identifiable negative samples. The numbers in (a) are the results reported from Han et al. or run using their code, and (b) reports our results (instead of one) which are assigned at random. For example, a single projection may be used to measure compatibility in the (shoe-top, bottom-hat, earrings-top, outwear-bottom) type-specific spaces. This approach allows us to assess the importance of having distinct learned compatibility spaces for each pair of item categories versus forcing the compatibility spaces to "share" multiple pairwise comparisons, thus allowing for better scalability as we add more fine-grained item categories to the model.

d.—VSE. Indicates that a visual-semantic embedding as described above is learned jointly with the compatibility embedding.

e.—Sim. Along with training the model to learn a visual-semantic embedding for compatibility between different categories of items as done with the VSE, the same embeddings are also used to measure similarity between items of the same category as described above.

f.—Metric. In the triplet loss, rather than minimizing Euclidean distance between compatible items and maximizing the same for incompatible ones, an empirically more robust way is to optimize over the inner products instead. To generalize the distance metric, we take an element-wise product of the embedding vectors in the type-specific spaces and feed it into a fully connected (FC) layer, the learned weights of which act as a generalized distance function.

Maryland Polyvore

We report performance using the test splits of Han et al. in Table 3 where the negative samples were sampled completely at random without restriction. Table 4 is a comparison of different methods on the Maryland Polyvore Dataset on the fill-in-the-blank and outfit compatibility tasks using our category-aware negative sampling method. (a) contains the results of prior work using their code unless otherwise noted, and (b) contains results using our approach.

TABLE 4

| Method | FITB Accuracy | Compat. AUC |
|---|---|---|
| (a) Bi-LSTM + VSE (512-D) [12] | 64.9 | 0.94 |
| SiameseNet (ours) | 54.4 | 0.85 |
| (b), T1:1 | 57.9 | 0.87 |
| CSN, T1:1 + VSE | 58.1 | 0.88 |
| CSN, T1:1 + VSE + Sim | 59.0 | 0.87 |
| CSN, T4:1 + VSE + Sim + Metric | 59.9 | 0.90 |
| CSN, T1:1 + VSE + Sim + Metric | 61.0 | 0.90 |
| CSN, T1:1 + VSE + Sim + Metric (512-D) | 65.0 | 0.93 |

Table 5 illustrates the effect the embedding size has on performance on the fill-in-the-blank and the outfit compatibility tasks on the Maryland Polyvore dataset using our negative samples.

TABLE 5

| Method | FITB Accuracy | Compat. AUC |
|---|---|---|
| CSN, T1:1 + VSE + Sim + Metric (32-D) | 55.7 | 0.88 |
| CSN, T1:1 + VSE + Sim + Metric (64-D) | 61.0 | 0.90 |
| CSN, T1:1 + VSE + Sim + Metric (128-D) | 62.4 | 0.92 |
| CSN, T1:1 + VSE + Sim + Metric (256-D) | 62.8 | 0.92 |
| CSN, T1:1 + VSE + Sim + Metric (512-D) | 65.0 | 0.93 |

The first line of Table 3(b) contains our replication of the approach of Veit, A., Kovacs, B., Bell, S., McAuley, J., Bala, K., Belongie, S., Learning visual clothing style with heterogeneous dyadic co-occurrences, ICCV (2015), using the same convolutional network as implemented in our models for a fair comparison. We see on the second line of Table 3(b) that performance on both tasks using all the negative samples in the test split is actually reduced, while after removing easily identifiable negative samples performance is increased. This is likely due to how the negatives were sampled. We only learn type-specific embeddings to compare the compositions of items which occur during training. Thus, at test time, if we are asked to compare two tops, but no outfit seen during training contained two tops, we did not learn a type-specific embedding for this case and are forced to compare them using our general embedding. This also explains why our performance drops using the negative samples of Han et al. when we include the similarity constraint on the third line of Table 3(b), since we explicitly try to learn similarity in our general embedding rather than compatibility. The same effect also accounts for the discrepancy when we train our learned metric shown in the last two lines of Table 3(b). Although we report much better performance than prior work using all the negative samples, our performance is as good or better than the performance of LSTM-based method of Han et al. after removing the easy negatives.

FIG. 12A is a graphic image to illustrate t-SNE of the learned general embedding space on Polyvore Outfits, according to an embodiment. We see the learned embedding respects color variations and for types where shape is a unique identifier (e.g., pants and sunglasses) items are more closely grouped together. FIG. 12B is a graphic image to illustrate overlapping items for each cell of the highlighted four columns in FIG. 12A, e.g., the overlapping items for each cell of the highlighted four columns in the t-SNE plot of FIG. 12A. Note that each row contains items that are very similar to each other, which suggests a well-behaved embedding. This is best viewed in color at high resolution.

Since many of the negative samples of Han et al. can be easily filtered out, and thus make it difficult to evaluate our method due to their invalid outfit compositions, we report performance on the fill-in-the-blank and outfit compatibility tasks where the negatives are selected by replacing items of the same category in Table 4. The first line of Table 3(b) shows that using our type-specific embeddings, we obtain a 2-3% improvement over learning a single embedding to compare all types. In the second and third lines of Table 4(b), we see that including our visual semantic embedding, along with training our general embedding to explicitly learn similarity between objects of the same category, provides improvements over simply learning our type-specific embeddings. We also see a pronounced improvement using our learned metric, resulting in a 3-4% improvement on both tasks over learning just the type-specific embeddings. The last line of Table 4(b) reports the results of our approach using the same embedding size as Han et al., illustrating that we obtain similar performance. This is particularly noteworthy since Han et al. uses a more powerful feature representation (Inception-v3 vs. ResNet-18), and takes into account the entire outfit when making comparisons, both of which would likely further improve our model. A full accounting of how the dimensions of the final embedding affects the performance of our approach is provided in Table 5.

Polyvore Outfits

We report our results on the fill-in-the-blank and outfit compatibility experiments using our own dataset in Tables 6-7. Table 6 is a comparison of different methods on the two versions of our dataset on the fill-in-the-blank and outfit compatibility tasks using our category-aware negative sampling method. Section (a) contain the results of prior work using their code unless otherwise noted, and Section (b) contains results using our approach.

TABLE 6

| Method | Polyvore Outfits-D | | Polyvore Outfits | |
|---|---|---|---|---|
| | FITB Accuracy | Compat. AUC | FITB Accuracy | Compat. AUC |
| (a) Bi-LSTM + VSE (512-D) | 39.4 | 0.62 | 39.7 | 0.65 |
| SiameseNet (ours) | 51.8 | 0.81 | 52.9 | 0.81 |
| (b) CSN, T1:1 | 52.5 | 0.82 | 54.0 | 0.83 |
| CSN, T1:1 + VSE | 53.0 | 0.82 | 54.5 | 0.84 |
| CSN, T1:1 + VSE + Sim | 53.4 | 0.82 | 54.7 | 0.85 |
| CSN, T4:1 + VSE + Sim + Metric | 53.7 | 0.82 | 55.1 | 0.85 |
| CSN, T1:1 + VSE + Sim + Metric | 54.1 | 0.82 | 55.3 | 0.86 |
| CSN, T1:1 + VSE + Sim + Metric (512-D) | 55.2 | 0.84 | 56.2 | 0.86 |

Table 7 illustrates additional results for Table 6. More specifically, Table 7 includes (a) results using the disclosed NN regressor model where some compatibility spaces are shared, (b) results where we use a fully connected layer to project our general embedding into our compatibility space, (c) comparison of our learned NN regressor model with using cosine distance, and (d) additional ablations including components illustrated in FIG. 4B. In Table 7, we provide an ablation study to supplement the results of Table 6. In further embodiments, additional layers are employed including the FC, which uses a fully connected layer for its type-specific projection rather than a learned diagonal projection, and Cosine, which uses cosine distance to train the NN regressor model rather than Euclidean distance. Here, we see that using a FC layer provides a small performance improvement at a higher computation cost while our learned metric performs slightly better than using cosine distance.

TABLE 7

| Method | Polyvore Outfits-D | | Polyvore Outfits | |
|---|---|---|---|---|
| | FITB Accuracy | Compat. AUC | FITB Accuracy | Compat. AUC |
| (a) CSN, T4:1 | 52.3 | 0.80 | 54.1 | 0.83 |
| CSN, T4:1 + VSE | 52.7 | 0.81 | 54.5 | 0.84 |
| CSN, T4:1 + VSE + Sim | 53.1 | 0.81 | 54.4 | 0.85 |
| CSN, T4:1 + VSE + Sim + Metric | 53.7 | 0.82 | 55.1 | 0.85 |
| (b) CSN, T1:1, FC | 53.3 | 0.82 | 54.6 | 0.85 |
| CSN, T1:1 + VSE, FC | 53.7 | 0.82 | 55.2 | 0.86 |
| CSN, T1:1 + VSE + Sim, FC | 53.7 | 0.83 | 55.6 | 0.86 |
| CSN, T1:1 + VSE + Sim + Metric, FC | 54.0 | 0.83 | 56.6 | 0.86 |
| (c) CSN, T1:1 + VSE + Sim + Metric | 54.1 | 0.82 | 55.3 | 0.86 |
| CSN, T1:1+ VSE + Sim + Cosine | 53.9 | 0.82 | 54.8 | 0.86 |
| (d) CSN, T1:1 + Sim | 53.1 | 0.82 | 54.4 | 0.84 |
| CSN, T1:1 + Metric | 53.3 | 0.83 | 54.6 | 0.84 |
| CSN, T1:1 + Sim + Metric | 53.6 | 0.83 | 54.8 | 0.85 |

The first line of Table 7(b) illustrates that learning our type specific embeddings gives a consistent improvement over training a single embedding to make comparisons. We note that our relative performance using the entire dataset is higher than our disjoint set, which we attribute to likely being due to the additional training data for learning each type-specific embedding. Analogous to the Maryland dataset, the next three lines of Table 7(b) illustrate a consistent performance improvement as we add in the remaining pieces of our model.

Interestingly, the two splits of our data obtain similar performance, with the better results using the easy version of our dataset only a little better than on the version where all items in all outfits are novel. This suggests that having unseen outfits in the test set is more important than ensuring there are no shared items between the training and testing splits, and hence in reproductions of our experiments, using the larger version of our dataset is a fair approach.

Table 8 illustrates the effect the embedding size has on performance on the fill-in-the-blank and the outfit compatibility tasks using the two versions of our dataset training a single embedding to make all comparisons.

TABLE 8

| Method | Polyvore Outfits-D | | Polyvore Outfits | |
| --- | --- | --- | --- | --- |
| | FITB Accuracy | Compat. AUC | FITB Accuracy | Compat. AUC |
| CSN, T1:1 + VSE + Sim + Metric (32-D) | 53.2 | 0.81 | 53.9 | 0.85 |
| CSN, T1:1 + VSE + Sim + Metric (64-D) | 54.1 | 0.82 | 55.3 | 0.86 |
| CSN, T1:1 + VSE + Sim + Metric (128-D) | 54.3 | 0.83 | 55.2 | 0.86 |
| CSN, T1:1 + VSE + Sim + Metric (256-D) | 54.8 | 0.84 | 55.6 | 0.86 |
| CSN, T1:1 + VSE + Sim + Metric (512-D) | 55.2 | 0.84 | 56.2 | 0.86 |

Figure 13A:
FIG. 13A, FIG. 13B, and FIG. 13C are graphic search results of the t-SNE of the learned type-specific embedding on the Polyvore dataset (FIG. 12A) for: A) tops and bags; B) shoes and sunglasses; and C) scarves and jewelry, respectively.
Figure 13B:
Figure 13C:

FIG. 13A, FIG. 13B, and FIG. 13C are graphic search results of the t-SNE of the learned type-specific embedding on the Polyvore dataset (FIG. 12A) for: A) tops and bags; B) shoes and sunglasses; and C) scarves and jewelry, respectively. As hypothesized, respecting type allows the embedding to specialize to features that dominate compatibility relationships for each pair of types: for example, color seems to matter more in FIG. 13A than in FIG. 13C, where shape is an equally important feature, with a concentration of long pendants in the lower right and smaller pieces towards the top. These are best viewed in color at high resolution.

Figure 14B:
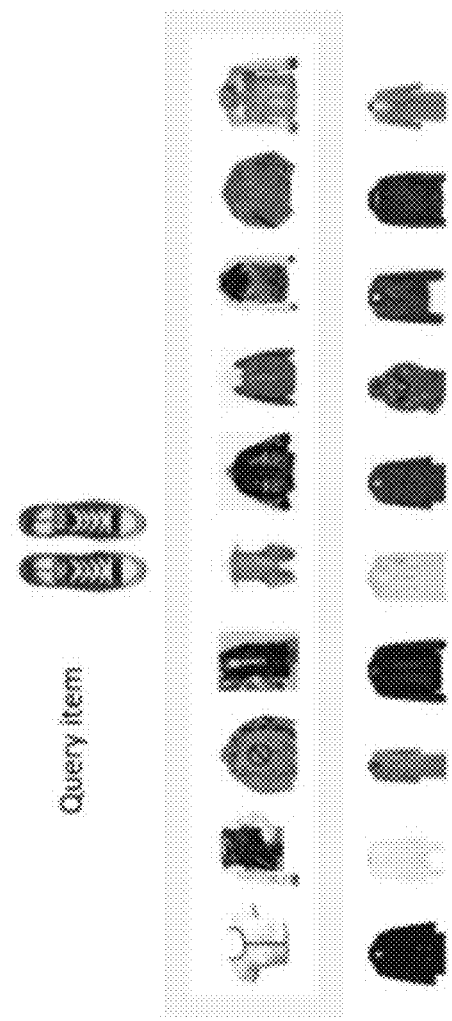
FIG. 14B is an image of a set of images of clothing items learned by the disclosed NN regressor model to be compatible with the pictures shoes, according to an embodiment.
Figure 14A:
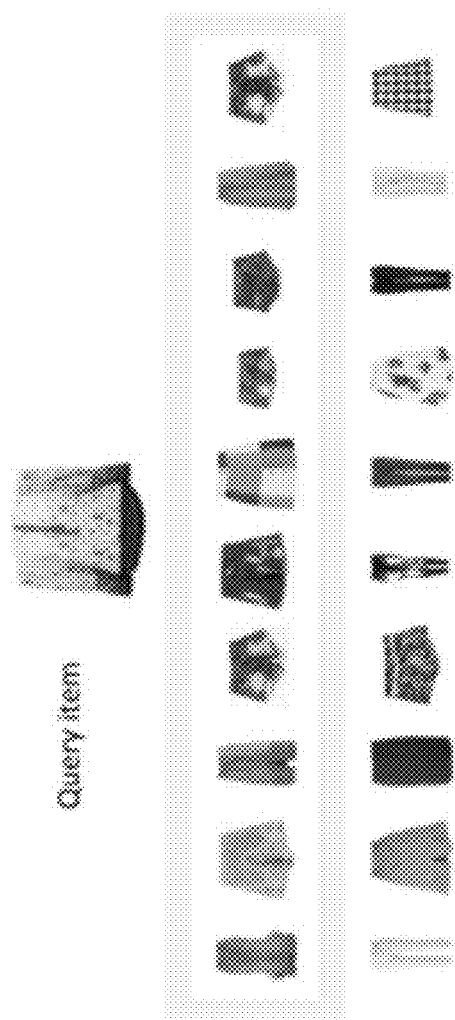
FIG. 14A is a set of images of clothing items learned by the disclosed NN regressor model to be compatible with the pictured blouse, according to an embodiment.

FIG. 14A is a set of images of clothing items learned by the disclosed NN regressor model to be compatible with the pictured blouse, according to an embodiment. FIG. 14B is an image of a set of images of clothing items learned by the disclosed NN regressor model to be compatible with the pictures shoes, according to an embodiment. In embodiments, the query item (top row) is randomly pulled from some type u. Rows shaded in gray show the model's suggestions for items compatible with the query item of a randomly selected type v. Bottom row shows items of type v sampled at random.

Figure 15:
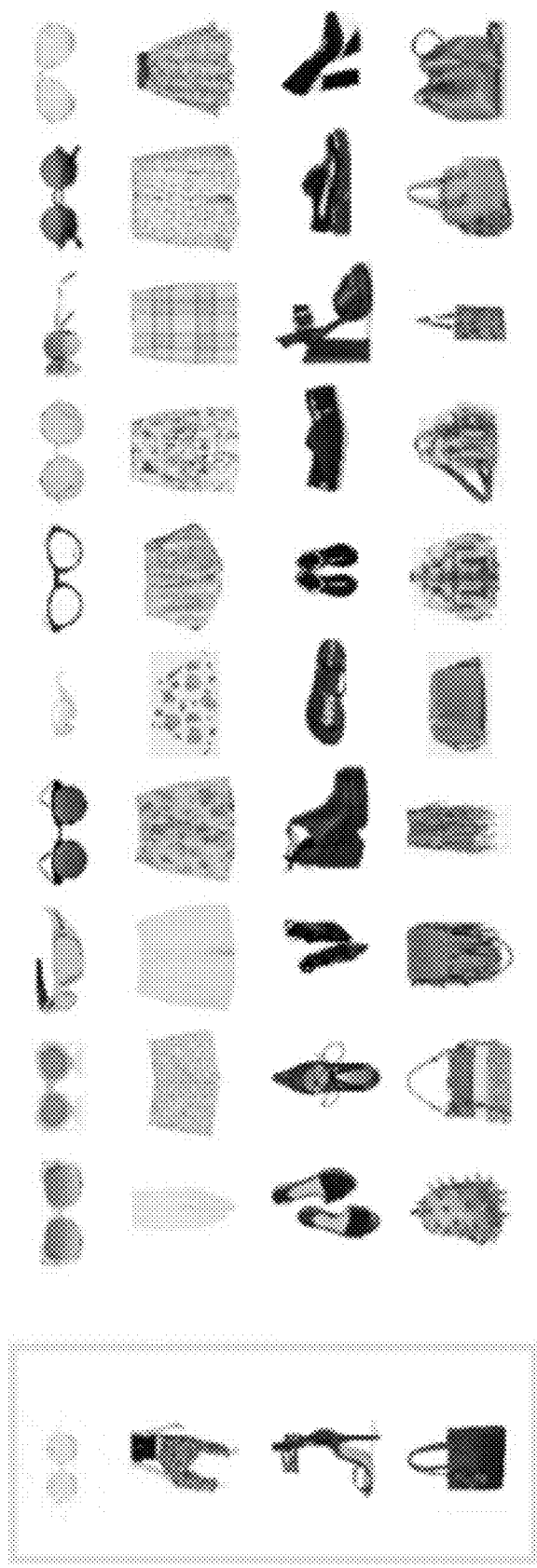
FIG. 15 is a set of images of clothing items, along a row, learned to have a similarity relationship to the items pictured in the first column, according to embodiments of the disclosed NN regressor model.

FIG. 15 is a set of images of clothing items, along a row, learned to have a similarity relationship to the items pictured in the first column, according to embodiments of the disclosed NN regressor model. The first (outlined) column illustrates the query image for each row. Rows contain similar items of the same type as the query item. Note that the learned item-based similarity is more nuanced than matching simply based on color or shape. For example, in the second row, the model is perfectly happy suggesting as alternatives both short- and long-leg pants as well as skirts, so long as the general light colors, flowery patterns and flowy materials are present. Similarly, in the third row, all similar shoes are black but they vastly differ in style, e.g., platform versus sandal versus bootie versus loafer, and all have a unique statement element just like the straps detail of the query item: laces, a golden clasp, yellow detail, and metal bridge.

Respecting type helps because the search engine server 120 visualizes the global embedding space and some type-specific embedding spaces with t-SNE. FIG. 12 shows the global embedding space; FIG. 13 shows three distinct type-specific embedding spaces. Note how the global space is strongly oriented toward color matches.

Figures 16A, 16B:
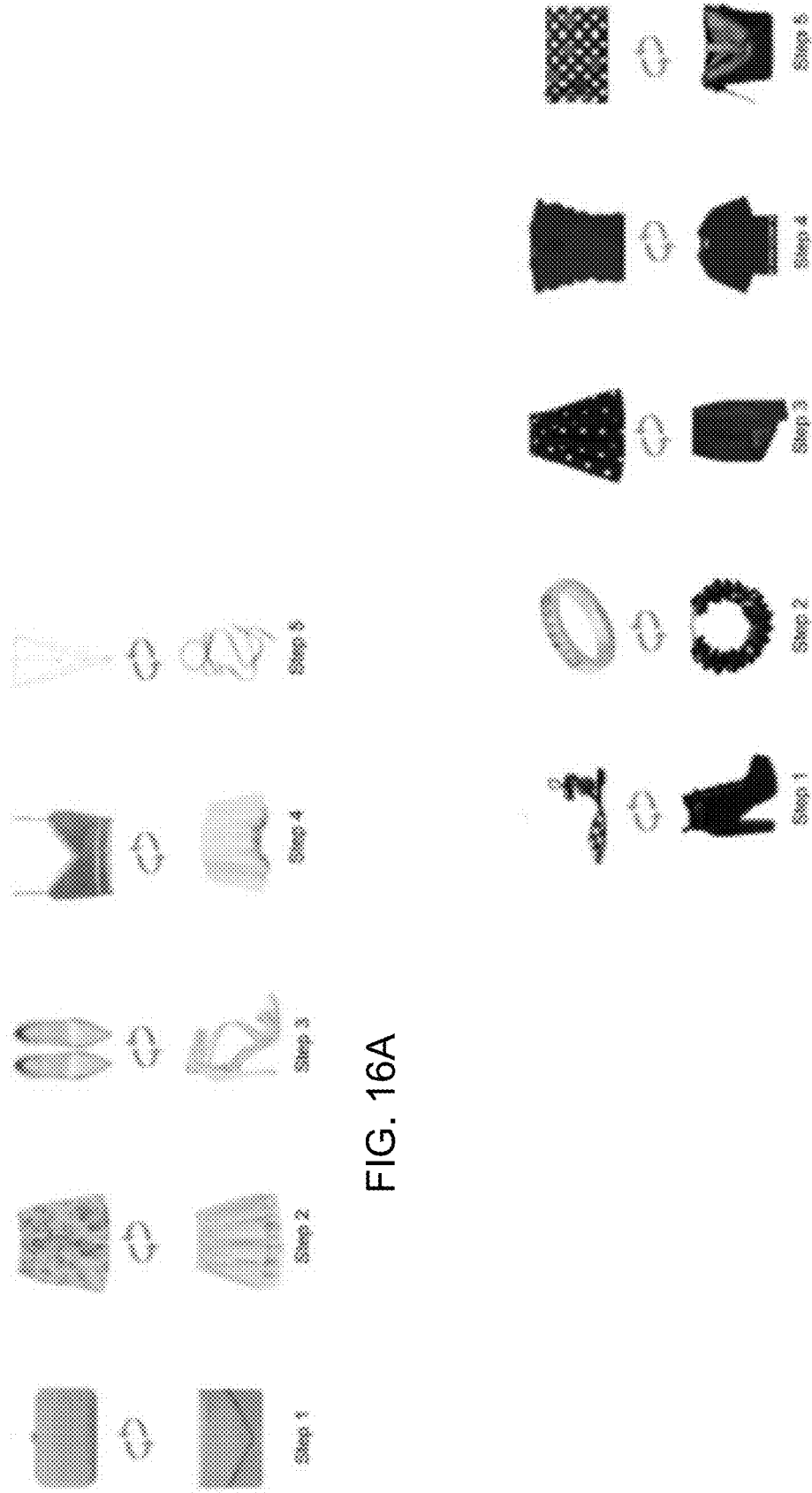
FIG. 16A is a set of images of clothing items to exemplify outfit generation by recursive item swaps, according to one embodiment of the disclosed NN regressor model.
FIG. 16B is a set of images of clothing items to exemplify outfit generation by recursive item swaps, according to another embodiment of the disclosed NN regressor model.

FIG. 16A is a set of images of clothing items to exemplify outfit generation by recursive item swaps, according to one embodiment of the disclosed NN regressor model. FIG. 16A is a set of images of clothing items to exemplify outfit generation by recursive item swaps, according to another embodiment of the disclosed NN regressor model. The examples in FIGS. 16A-16B are of outfit generation by recursive item swaps. The top row represents a valid (e.g., human-curated) outfit. At each step, we replace an item from the starting outfit with one that is of the same type and equally compatible with the rest of the outfit, but different from the removed item. Best viewed in color (large areas allocated to each range of color), but for example the scarf-jewelry space in FIG. 13C is not particularly focused on color representation, preferring to encode shape (long pendants versus smaller pieces). As a result, local type-specific spaces can specialize in different aspects of appearance, and so force the global space to represent all aspects fairly evenly.

Geometric Queries. In light of the problems pointed out in the introduction, we show that our type-respecting embedding is able to handle the following geometric queries which previous models are unable or ill-equipped to perform. SiameseNet is not able to answer such queries by construction, and it is not straightforward how the approach of Han et al. would have to be repurposed in order to handle them. Our model is the first to demonstrate that this type of desirable query can be successfully addressed.

Given an item $x_i^{(u)}$ of a certain type, show a collection of items $\{x_j^{(v)}\}_{j=1}^{N}$ of a different type that are all compatible with $0_i^{(u)}$ but dissimilar from each-other (see FIGS. 14A-14B).

Given an item $x_i^{(u)}$ of a certain type, show a collection of items $\{x_j^{(u)}\}_{j=1}^{N}$ of the same type that are all interchangeable with $x_i^{(u)}$ but have diverse appearance (see FIG. 15).

Given a valid outfit=$\{x_k^{(\tau)}\}_{k=1,\tau=1}^{K,T}$, replace each item $x_k^{(\tau)}$ in turn with an item $\tilde{x}^{(\tau)}$ of the same type which is different from $x_k^{(\tau)}$, but compatible—the rest of the outfit $$S_{\{x_k^{(\tau)}\}},$$

(see FIG. 16).

Given an item $x_i^{(u)}$ from a valid outfits=$\{x_k^{(\tau)}\}_{k=1,\tau=1}^{K,T}$, show a collection of replacement items $\{x_j^{(u)}\}_{j=1}^{N}$ of the same type that are all compatible with the rest of the outfit $$S_{\{x_i^{(u)}\}}$$

but visually different from $x_i^{(u)}$ (see FIG. 17).

FIGS. 17A, 17B, 17C, and 17D is each a set of images of clothing items to exemplify item swaps and outfit diversification, according to various embodiments of the disclosed model. Rows encircled by dark boxes represent a human-curated outfit. Separately framed within these dark boxes is a randomly selected heldout item from the outfit to be replaced. Rows encircled by a light boxes display alternatives that are equally compatible with the rest of the outfit as the heldout item. The bottom row shows a random selection of alternatives of the same type as the heldout item. The suggested alternatives made by the NN regressor model in the middle row, although equally compatible with the rest of the items in the outfit, are not forced to be similar to each other but differ vastly in color, style, shape and fine-grained type. These images are best viewed in color.

Figure 18:
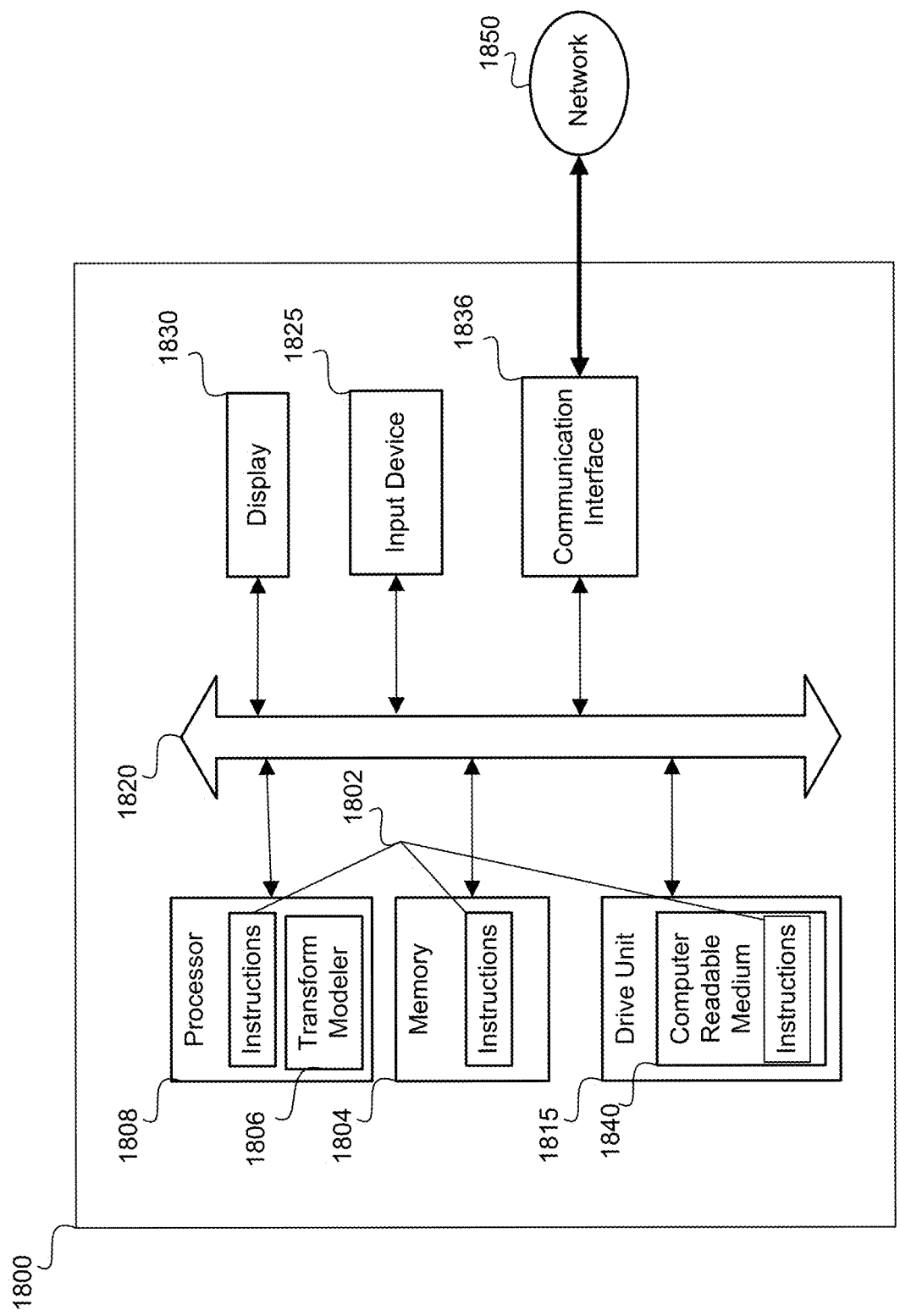
FIG. 18 is a computing system that may be used for or in conjunction with any of the disclosed methods according to the embodiments disclosed herein.

FIG. 18 illustrates a general computer system 1800, which may represent the search engine server 120 and/or the Web servers 114A and 114B or another device or system to which is referred or which is capable of executing the embodiment as disclosed herein. The computer system 1800 may include an ordered listing of a set of instructions 1802 that may be executed to cause the computer system 1800 to perform any one or more of the methods or computer-based functions disclosed herein. The computer system 1800 may operate as a stand-alone device or may be connected to other computer systems or peripheral devices, e.g., by using a network 1850.

In a networked deployment, the computer system 1800 may operate in the capacity of a server or as a client-user computer in a server-client user network environment, or as a peer computer system in a peer-to-peer (or distributed) network environment. The computer system 1800 may also be implemented as or incorporated into various devices, such as a personal computer or a mobile computing device capable of executing a set of instructions 1802 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1800 may include a memory 1804 on a bus 1820 for communicating information. Code operable to cause the computer system to perform any of the acts or operations described herein may be stored in the memory 1804. The memory 1804 may be a random-access memory, read-only memory, programmable memory, hard disk drive or other type of volatile or non-volatile memory or storage device.

The computer system 1800 may include a processor 1808, such as a central processing unit (CPU) and/or a graphics processing unit (GPU). The processor 1808 may include one or more general processors, digital signal processors, application specific integrated circuits, field programmable gate arrays, digital circuits, optical circuits, analog circuits, combinations thereof, or other now known or later-developed devices for analyzing and processing data. The processor 1808 may implement the set of instructions 1802 or other software program, such as manually-programmed or computer-generated code for implementing logical functions. The logical function or system element described may, among other functions, process and/or convert an analog data source such as an analog electrical, audio, or video signal, or a combination thereof, to a digital data source for audio-visual purposes or other digital processing purposes such as for compatibility for computer processing.

The processor 1808 may include a transform modeler 1806 or contain instructions for execution by a transform modeler 1806 provided a part from the processor 1808. The transform modeler 1806 may include logic for executing the instructions to perform the transform modeling and image reconstruction as discussed in the present disclosure.

The computer system 1800 may also include a disk (or optical) drive unit 1815. The disk drive unit 1815 may include a non-transitory computer-readable medium 1840 in which one or more sets of instructions 1802, e.g., software, can be embedded. Further, the instructions 1802 may perform one or more of the operations as described herein. The instructions 1802 may reside completely, or at least partially, within the memory 1804 and/or within the processor 1808 during execution by the computer system 1800. Accordingly, the databases displayed and described above with reference to FIGS. 2A and 2B may be stored in the memory 1804 and/or the disk unit 1815.

The memory 1804 and the processor 1808 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1800 may include an input device 1825, such as a keyboard or mouse, configured for a user to interact with any of the components of system 1800. It may further include a display 1830, such as a liquid crystal display (LCD), a cathode ray tube (CRT), or any other display suitable for conveying information. The display 1830 may act as an interface for the user to see the functioning of the processor 1808, or specifically as an interface with the software stored in the memory 1804 or the drive unit 1815.

The computer system 1800 may include a communication interface 1836 that enables communications via the communications network 1810. The network 1810 may include wired networks, wireless networks, or combinations thereof. The communication interface 1836 network may enable communications via a number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. A computer system or other apparatus adapted for carrying out the methods described herein is suited to the present disclosure. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A search engine server comprising:
   a communication interface to receive a multi-modal query from a browser of a client device, the multi-modal query comprising at least a first image of an item; and
   a processing device coupled to the communication interface, the processing device to:
   train a neural network (NN) regressor model by iteratively performing operations comprising:
      computing a visual semantic embedding for a training image categorized similar to the first image, the visual semantic embedding comprising feature vectors mapped within a type-specific feature space;
      executing, on the visual semantic embedding, one or more sets of fully connected NN layers and rectifier linear unit layers to generate intermediate NN vector outputs;
      executing a complete vector predictor on the intermediate NN vector outputs to predict values of a complete text vector corresponding to the training image, the complete text vector comprising a subset of characteristic terms of a text lexicon of item characteristics that are predicted as a group with one or more NN layers;
      executing an individual term predictor on the intermediate NN vector outputs to separately predict individual term values using corresponding individual NN neurons, wherein the individual term values are separately related to respective characteristic terms of the text lexicon; and
      minimizing a loss function using the predicted values of the complete text vector and the predicted individual term values generated by the individual term predictor to generate a final subset of predicted term values that trains the NN regressor model to generate a string of the characteristic terms most associated with the training image;
   execute the trained NN regressor model on the first image to identify a plurality of second items that are one of similar to or compatible with the item depicted in the first image;
   generate, using characteristic terms corresponding to highest values of the final subset of predicted term values over multiple training iterations, structured text that explains, within one of a phrase or a sentence, why the plurality of second items are relevant to the item; and
   return, to the browser of the client device, a set of search results comprising a set of images, corresponding to the plurality of second items, and the structured text.

2. The search engine of claim 1, wherein the item and the plurality of second items are fashion items and the NN regressor model is trained to recognize the fashion items via use of a text lexicon of fashion characteristics, the fashion characteristics categorized within a group comprising type, color, material, style, shape, pattern, trim, and brand.

3. The search engine of claim 1, wherein the multi-modal query further comprises one or more word that describes the first image, and wherein the processing device is further to:
   execute the trained NN regressor model on the first image and the one or more word to identify the plurality of second items; and
   generate the structured text that explains why the set of images are relevant to the item, as described by the one or more word.

4. The search engine server of claim 1, wherein to train the NN regressor model, the processing device is further to calculate a mean square loss between the predicted values within the complete text vector and the predicted individual term values for corresponding individual terms generated using the individual term predictor to determine which of the characteristic terms are most descriptive of the training image.

5. The search engine server of claim 1, wherein the multi-modal query further comprises one or more word that describes the first image, and wherein, to generate the structured text, the processing device is further to:
   determine a number of most associated items of the plurality of second items;
   compute, using a sigmoid activation layer, an average activation score for each characteristic term, in a text lexicon, associated with each respective second item of the number of most associated items;
   determine a subset of the characteristic terms that have a highest average activation score; and
   employ the subset of the characteristic terms within the structured text that forms explanations for delivery of the set of images in the set of search results.

6. The search engine server of claim 5, wherein, to determine the number of most associated items, the processing device is further to:
   compute a visual semantic embedding of each second item of the plurality of second items, the visual semantic embedding comprising feature vectors mapped within a type-specific feature space;
   compute association scores for the one or more word of the multi-modal query via comparison of the one or more word to each respective visual semantic embedding; and
   return a subset of the second items that has a highest association score of the computed association scores as the number of most associated items of the plurality of second items.

7. The search engine of claim 1, wherein executing the complete vector predictor and executing the individual term predictor are performed in parallel.

8. A method comprising:
   receiving, via a communication interface, a multi-modal query from a browser of a client device, the multi-modal query comprising at least a first image of an item;
   training, using a processing device, a neural network (NN) regressor model by iteratively performing operations comprising:
      computing a visual semantic embedding for a training image categorized similar to the first image, the visual semantic embedding comprising feature vectors mapped within a type-specific feature space;
      executing, on the visual semantic embedding, one or more sets of fully connected NN layers and rectifier linear unit layers to generate intermediate NN vector outputs;
      executing a complete vector predictor on the intermediate NN vector outputs to predict values of a complete text vector corresponding to the training image, the complete text vector comprising a subset of characteristic terms of a text lexicon of item characteristics that are predicted as a group with one or more NN layers;
      executing an individual term predictor on the intermediate NN vector outputs to separately predict individual term values using corresponding individual NN neurons, wherein the individual term values are separately related to respective characteristic terms of the text lexicon; and
      minimizing a loss function using the predicted values of the complete text vector and the predicted individual term values generated by the individual term predictor to generate a final subset of predicted term values that trains the NN regressor model to generate a string of the characteristic terms most associated with the training image;
   executing the trained NN regressor model on the first image to identify a plurality of second items that are one of similar to or compatible with the item depicted in the first image;
   generating, by the processing device and using characteristic terms corresponding to highest values of the final subset of predicted term values over multiple training iterations, structured text that explains, within one of a phrase or a sentence, why the plurality of second items are relevant to the item; and
   returning, to the browser of the client device, a set of search results comprising a set of images, corresponding to the plurality of second items, and the structured text.

9. The method of claim 8, wherein the item and the plurality of second items are fashion items and the NN regressor model is trained to recognize the fashion items via use of a text lexicon of fashion characteristics, the fashion characteristics categorized within a group comprising type, color, material, style, shape, pattern, trim, and brand.

10. The method of claim 8, wherein the multi-modal query further comprises one or more word that describes the first image, the method further comprising:
   executing the trained NN regressor model on the first image and the one or more word to identifying the plurality of second items; and
   generating the structured text that explains why the set of images are relevant to the item, as described by the one or more word.

11. The method of claim 8, wherein to train the NN regressor model, the processing device is further to calculate a mean square loss between the predicted values within the complete text vector and the predicted individual term values for corresponding individual terms generated using the individual term predictor to determine which of the characteristic terms are most descriptive of the training image.

12. The method of claim 8, wherein the multi-modal query further comprises one or more word that describes the first image, and wherein, to generate the structured text, the method further comprising:
   determining a number of most associated items of the plurality of second items;

computing, using a sigmoid activation layer, an average activation score for each characteristic term, in a text lexicon, associated with each respective second item of the number of most associated items;

determining a subset of the characteristic terms that have a highest average activation score; and employing the subset of the characteristic terms within the structured text that forms explanations for delivery of the set of images in the set of search results.

13. The method of claim 12, wherein, to determine the number of most associated items, the method further comprising:

computing a visual semantic embedding of each second item of the plurality of second items, the visual semantic embedding comprising feature vectors mapped within a type-specific feature space;

computing association scores for the one or more word of the multi-modal query via comparison of the one or more word to each respective visual semantic embedding; and returning a subset of the second items that has a highest association score of the computed association scores as the number of most associated items of the plurality of second items.

14. The method of claim 8, wherein executing the complete vector predictor and executing the individual term predictor are performed in parallel.

15. A non-transitory computer-readable medium storing instructions, which when executed by a processing device, cause the processing device to perform operations comprising iteratively:

computing a visual semantic embedding for a training image that has been categorized, the visual semantic embedding comprising feature vectors mapped within a type-specific feature space;

executing, on the visual semantic embedding, one or more sets of fully connected neural network (NN) layers and rectifier linear unit layers to generate intermediate NN vector outputs of a NN regressor model;

executing a complete vector predictor on the intermediate NN vector outputs to predict values of a complete text vector corresponding to the training image, the complete text vector comprising a subset of characteristic terms of a text lexicon of item characteristics that are predicted as a group with one or more NN layers;

executing an individual term predictor on the intermediate NN vector outputs to separately predict individual term values using corresponding individual NN neurons, wherein the individual term values are separately related to respective characteristic terms of the text lexicon;

minimizing a loss function using the predicted values of the complete text vector and the predicted individual term values generated by the individual term predictor to generate a final subset of predicted term values that trains the NN regressor model to generate a string of the characteristic terms most associated with the training image;

receiving, via a communication interface, a multi-modal query from a browser of a client device, the multi-modal query comprising at least a first image of an item;

executing the trained NN regressor model on the first image to identify a plurality of second items that are one of similar to or compatible with the item depicted in the first image;

generating, by the processing device and using characteristic terms corresponding to highest values of the final subset of predicted term values over multiple training iterations, structured text that explains, within one of a phrase or a sentence, why the plurality of second items are relevant to the item; and returning, to the browser of the client device, a set of search results comprising a set of images, corresponding to the plurality of second items, and the structured text.

16. The non-transitory computer-readable medium of claim 15, wherein to train the NN regressor model, the processing device is further to calculate a mean square loss between the predicted values within the complete text vector and the predicted individual term values for corresponding individual terms generated using the individual term predictor to determine which of the characteristic terms are most descriptive of the training image.

17. The non-transitory computer-readable medium of claim 15, wherein the item and the plurality of second items are fashion items and the NN regressor model is trained to recognize the fashion items via use of a text lexicon of fashion characteristics, the fashion characteristics categorized within a group comprising type, color, material, style, shape, pattern, trim, and brand.

18. The non-transitory computer-readable medium of claim 15, wherein the multi-modal query further comprises one or more word that describes the first image, the operations further comprising:

executing the trained NN regressor model on the first image and the one or more word to identifying the plurality of second items; and generating the structured text that explains why the set of images are relevant to the item, as described by the one or more word.

19. The non-transitory computer-readable medium of claim 15, wherein the multi-modal query further comprises one or more word that describes the first image, and wherein, to generate the structured text, the operations further comprising:

determining a number of most associated items of the plurality of second items;

computing, using a sigmoid activation layer, an average activation score for each characteristic term, in a text lexicon, associated with each respective second item of the number of most associated items;

determining a subset of the characteristic terms that have a highest average activation score; and employing the subset of the characteristic terms within the structured text that forms explanations for delivery of the set of images in the set of search results.

20. The non-transitory computer-readable medium of claim 19, wherein, to determine the number of most associated items, the operations further comprising:

computing a visual semantic embedding of each second item of the plurality of second items, the visual semantic embedding comprising feature vectors mapped within a type-specific feature space;

computing association scores for the one or more word of the multi-modal query via comparison of the one or more word to each respective visual semantic embedding; and returning a subset of the second items that has a highest association score of the computed association scores as the number of most associated items of the plurality of second items.

* * * * *